(12) United States Patent
Yoneyama et al.

(10) Patent No.: US 9,586,143 B2
(45) Date of Patent: Mar. 7, 2017

(54) GAME CONTROL DEVICE, GAME CONTROL METHOD, PROGRAM, RECORDING MEDIUM, AND GAME SYSTEM

(71) Applicant: KONAMI DIGITAL ENTERTAINMENT CO., LTD., Minato-ku, Tokyo (JP)

(72) Inventors: Minoru Yoneyama, Kashiwa (JP); Akihiko Shimizu, Tokyo (JP); Kensuke Kokami, Yokohama (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 318 days.

(21) Appl. No.: 14/381,191

(22) PCT Filed: Nov. 1, 2012

(86) PCT No.: PCT/JP2012/007023
§ 371 (c)(1),
(2) Date: Aug. 26, 2014

(87) PCT Pub. No.: WO2013/128515
PCT Pub. Date: Sep. 6, 2013

(65) Prior Publication Data
US 2015/0024813 A1   Jan. 22, 2015

(30) Foreign Application Priority Data
Feb. 27, 2012  (JP) ................................. 2012-040608

(51) Int. Cl.
*A63F 13/86* (2014.01)
*A63F 13/60* (2014.01)
(Continued)

(52) U.S. Cl.
CPC .............. *A63F 13/60* (2014.09); *A63F 13/65* (2014.09); *A63F 13/812* (2014.09); *A63F 13/86* (2014.09);
(Continued)

(58) Field of Classification Search
CPC .......... A63F 13/60; A63F 13/65; A63F 13/86; A63F 13/812
See application file for complete search history.

(56) References Cited

U.S. PATENT DOCUMENTS 4,261,569 A * 4/1981 Frohlich ............. A63F 3/00031
273/244.2
2005/0077676 A1 * 4/2005 Long ................... A63F 3/00031
273/244
(Continued)

FOREIGN PATENT DOCUMENTS

JP   2000-189677 A   7/2000
JP   2003-205170 A   7/2003
(Continued)

OTHER PUBLICATIONS

International Search Report in PCT/JP2012/007023 dated Feb. 5, 2013.

*Primary Examiner* — James S McClellan
*Assistant Examiner* — Kevin Carter
(74) *Attorney, Agent, or Firm* — Global IP Counselors, LLP

(57) ABSTRACT

The disclosed game control device is a device executing a game that simulates a sport or an amusement in the real world. The device includes: a setter configured to set a situation in a sport or an amusement before an event on the game; an event generator configured to generate the event based on information of an operational input under the situation set by the setter; and a result generator configured (Continued)

to generate a game result based on the situation set by the setter and the event generated by the event generator.

12 Claims, 22 Drawing Sheets

(51) Int. Cl.
*A63F 13/65* (2014.01)
*A63F 13/812* (2014.01)

(52) U.S. Cl.
CPC ... *A63F 2300/69* (2013.01); *A63F 2300/8052* (2013.01)

(56) References Cited

U.S. PATENT DOCUMENTS

| 2009/0275371 | A1* | 11/2009 | Takahashi | A63F 13/10 |
| | | | | 463/3 |
| 2012/0015746 | A1* | 1/2012 | Mooney | A63F 13/822 |
| | | | | 463/42 |

FOREIGN PATENT DOCUMENTS

| JP | 2008-113808 A | 5/2008 |
| JP | 2009-291238 A | 12/2009 |
| JP | 2012-000447 A | 1/2012 |

* cited by examiner

| User ID | 000001 | |
|---|---|---|
| User name/Display image | KNM | xxx.jpg |
| Team | P1 | |
| Skill level | Lv85 | |
| Action points | 35 | |
| Operation points | 60 | |
| Enhancement points | 3500 | |
| Cheering points | 15000 | |
| Number of players | 40(MAX60) | |
| Friends | 012345,······ | |
| Image data of owned cards | Player card | Image data |
| | PL001 | xxx.jpg |
| | PL081 | xxx.jpg |
| | ⋮ | ⋮ |

| Parameters of owned cards | Player | Ability value | | | ... |
| --- | --- | --- | --- | --- | --- |
| | | Batting ability | Running ability | Fielding ability | |
| | PL001 | 300 | 450 | 810 | ... |
| | PL081 | 200 | 250 | 400 | ... |
| | ⋮ | ⋮ | ⋮ | ⋮ | ⋮ |

User database

FIG.6

[Hit ball squarely]

|  | No outs | | One out | | Two outs | |
| --- | --- | --- | --- | --- | --- | --- |
|  | HITS | OUTS | HITS | OUTS | HITS | OUTS |
| 1st pitch | 95% | 5% | — | — | — | — |
| 2nd pitch | 90% | 10% | 95% | 5% | — | — |
| 3rd pitch | 80% | 20% | 90% | 10% | 95% | 5% |
| 4th pitch | 70% | 30% | 80% | 20% | 90% | 10% |
| 5th pitch | 60% | 40% | 70% | 30% | 80% | 20% |
| 6th pitch | 50% | 50% | 60% | 40% | 70% | 30% |
| 7th pitch | 0% | 100% | 50% | 50% | 60% | 40% |
| 8th pitch | — | — | 0% | 100% | 50% | 50% |
| 9th pitch | — | — | — | — | 0% | 100% |

FIG.12A

[Swing strongly]

|  | No outs | | One out | | Two outs | |
| --- | --- | --- | --- | --- | --- | --- |
|  | HITS | OUTS | HITS | OUTS | HITS | OUTS |
| 1st pitch | 70% | 30% | — | — | — | — |
| 2nd pitch | 60% | 40% | 70% | 30% | — | — |
| 3rd pitch | 50% | 50% | 60% | 40% | 70% | 30% |
| 4th pitch | 40% | 60% | 50% | 50% | 60% | 40% |
| 5th pitch | 30% | 70% | 40% | 60% | 50% | 50% |
| 6th pitch | 20% | 80% | 30% | 70% | 40% | 60% |
| 7th pitch | 0% | 100% | 20% | 80% | 30% | 70% |
| 8th pitch | — | — | 0% | 100% | 20% | 80% |
| 9th pitch | — | — | — | — | 0% | 100% |

FIG.12B

| User ID | Time |
|---|---|
|  |  |
| 138940 | 2012/2/24 10:08 |
| 160423 | 2012/2/24 10:10 |
| 344001 | 2012/2/24 10:12 |
| 298708 | 2012/2/24 10:12 |
| 520198 | 2012/2/24 10:15 |
| ⋮ | ⋮ |

Log data

FIG.15

| Number of friends who login to game | Number of runners (positions) |
|---|---|
| 0 | 0 or 1 (1st base) |
| 1 | 1 (2nd or 3rd base) |
| 2-4 | 2 (2nd or 3rd base) |
| 5 or more | 3 (bases loaded) |

FIG.16

User ID:000001

| User ID of friends | Cheering frequency | Number of times of presents | Degree of intimacy |
|---|---|---|---|
| 012345 | 1 | 0 | 1 |
| 003421 | 10 | 11 | 8 |
| ⋮ | ⋮ | ⋮ | ⋮ |

Data of degree of intimacy

FIG.18

GAME CONTROL DEVICE, GAME CONTROL METHOD, PROGRAM, RECORDING MEDIUM, AND GAME SYSTEM

CROSS-REFERENCE TO RELATED APPLICATION

The present invention is based upon and claims the benefit of priority of the prior Japanese Patent Application No. 2012-040608, filed on Feb. 27, 2012, the entire contents of which are incorporated herein by reference.

FIELD

The present invention relates to a technique for controlling a progress of a game for respective users.

BACKGROUND

Conventionally, a user has enjoyed games by operating a game device by himself or herself. In this case, the game device includes a hardware that reads game application software (game application program) and executes the program. Competitive games such as a baseball game or the like are known as games that are realized with game applications. In order to enhance game entertainment, such Competitive games may include a variety of functions as well as a competition itself. For example, Competitive games include a function that allows a user to customize abilities of game characters to be operated by the user.

For example, a laid-open Japanese patent publication 2000-189677 discloses a game system (baseball game) that includes schedule generation means for generating an action schedule for respective game characters. In this game system, a user can instruct a game character to do a specific action in order to enhance ability of the game character. In this game system, it is assumed that a user trains game characters (that is, enhance abilities of game characters) or competes against the other user or CPU. It is also assumed that the user performs a training and a competition in turns.

Recently, so-called social network games have become widespread which run on game applications created on the basis of operating environments such as application programming interfaces (API) operated on a web browser in a social networking service (SNS) provided by a particular service provider. Social network games may be defined as a type of online game played between a plurality of unspecified users who are communicating with each other. A player who has a communication terminal connectable to the Internet and with a web browser installed is able to enjoy network games regardless of time or location.

SUMMARY OF THE INVENTION

Some of the aforementioned social network games are of user friendly. In the case of games that simulate sports or amusements in the real world, such as a baseball game, the social network games are often configured to allow users to immediately confirm a result of a match. Therefore, such social network games are now being accepted by users who do not want to spend much time for playing games or users who want to casually play games. On the other hand, in the social network games, the result of a match may be obtained with a simple pressing operation to a button, etc. Due to this simple operation, a user is not interested in a game process until the result of the match is obtained. In view of the above, the social network games have drawbacks that game play is monotonous and lacks a fun factor.

The present invention has been devised in consideration of the above. An object of the present invention is to provide a game control device, a game control method, a program, a recording medium, and a game system that allow respective users to play a game with simple operations while keeping interest with regard to a game process until a game result is obtained.

An aspect of the present invention is a game control device executing a game that simulates a sport or an amusement in the real world, the device including: a setter configured to set a situation in a sport or an amusement before an event on the game; an event generator configured to generate the event based on information of an operational input under the situation set by the setter; and a result generator configured to generate a game result based on the situation set by the setter and the event generated by the event generator.

This game control device may further include: an associator configured to associate users; an acquirer configured to acquire access information from a user; and a calculator configured to calculate a number of the users who are associated with a first user, the users performing access during a period of time based on the access information acquired by the acquirer, the first user playing the game, wherein the setter sets the situation such that the game result is advantageous for the first user as the number of the users increases.

This game control device may further include: an associator configured to associate users; an acquirer configured to acquire access information from a user; and a calculator configured to calculate a number of the users associated with a first user, the users performing access during a period of time based on the access information acquired by the acquirer, the first user playing the game, wherein the event is generated more than two times consecutively, the setter sets the situation before the event on the game such that the game result is advantageous for the first user as a value increases, the value being initially the number of the users calculated by the calculator, the value being decreased by one every time the event is generated.

This game control device may further include: an associator configured to associate users; and an acquirer configured to acquire access information from a user, wherein the setter sets the situation based on the access information acquired by the acquirer such that the game result is advantageous for a first user as degree of intimacy between the first user and a second user increases, the first user playing the game, the second user being associated with the first user, the second user performing access during a period of time, the degree of intimacy indicating a degree of association of the first user and the second user on the game.

This game control device may further including: an associator configured to associate users; and an acquirer configured to acquire access information from a user, wherein the setter sets the situation based on the access information acquired by the acquirer such that the game result is advantageous for a first user as the sum of values increases, the first user playing the game, the values each corresponding to different second users, the second users being associated with the first user, the second users performing access during a period of time.

Another aspect of the present invention is a game control device executing a game that simulates a baseball, the device including: a setter configured to set an on-base situation of a runner character before a hitting event on the game; an event generator configured to generate the hitting event based on information of an operational input under the on-base situation set by the setter; and a result generator configured to generate a game result based on the on-base situation set by the setter and the hitting event generated by the event generator.

This game control device may further include: an associator configured to associate users; and an acquirer configured to acquire access information from a user, wherein the setter sets the on-base situation for a first user such that a second user corresponds to the runner character based on the access information acquired by the acquirer, the first user playing the game, the second user being associated with the first user and performing access during a period of time.

In this game control device, when the running character exists on at least one base, the setter sets the on-base situation such that the running character corresponding to the second user is positioned on a base that is close to the home base as degree of intimacy between the first user and the second user increases, the degree of intimacy indicating a degree of association of the first user and the second user on the game.

BRIEF DESCRIPTION OF THE DRAWING

Referring now to the attached drawings which form a part of this disclosure:

FIG. 6 illustrates an exemplary configuration of a user database that is included in the database server according to the first embodiment;

FIG. 12A illustrates an example of data for determination;

FIG. 12B illustrates an example of data for determination;

FIG. 15 illustrates an example of a content of log data;

FIG. 16 illustrates an example of a content of situation setting data;

FIG. 18 illustrates an example of data of degree of intimacy; and

DETAILED DESCRIPTION OF THE EMBODIMENTS

The first embodiment of the present embodiment will be described below.

(1-1) Configuration of Game System

Figure 1:
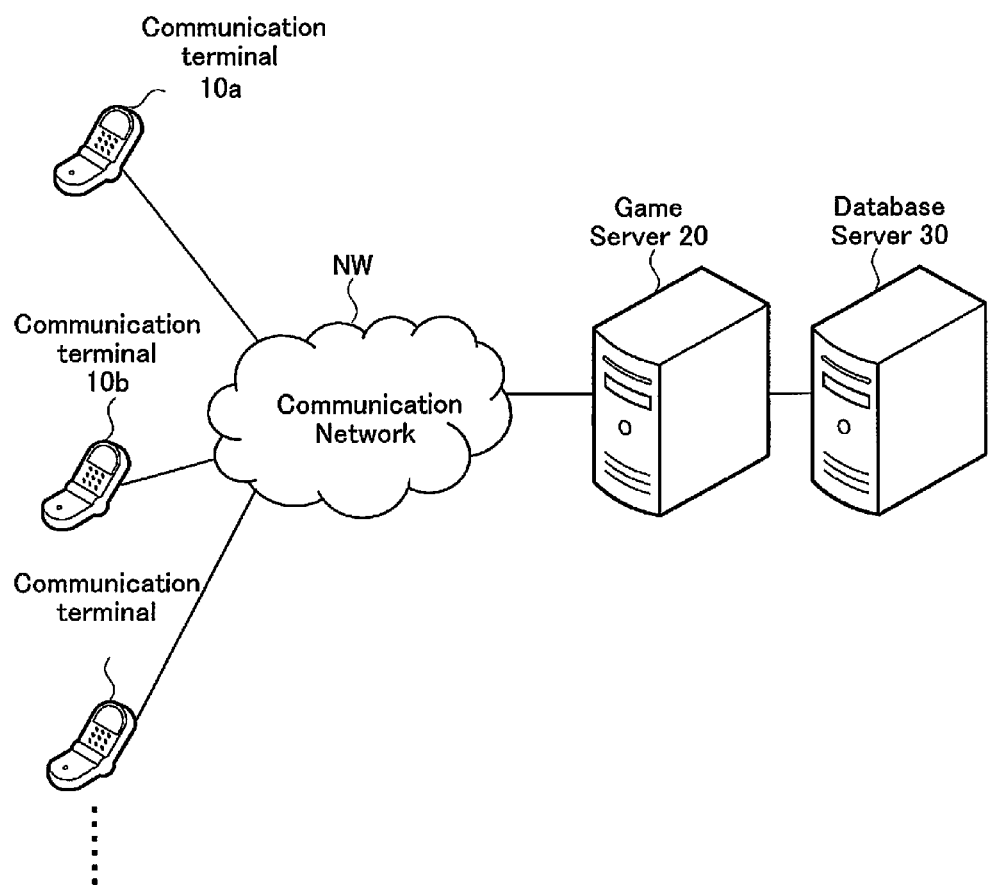
FIG. 1 illustrates a basic configuration diagram of a game system according to a first embodiment.

FIG. 1 illustrates an exemplary system configuration of a game system according to embodiments. As illustrated in FIG. 1, the game system includes a plurality of communication terminals 10a, 10b, 10c and etc. that are connectable to a communication network NW such as the Internet, a game server 20 that is connectable to the communication network NW, and a database server 30. Each of the communication terminals 10a, 10b, 10c and etc. is a communication terminal operated by individual users, such as a mobile terminal, a smartphone, a personal digital assistant (PDA), a personal computer, or a television receiver including a two-way communication function (including a so-called multi-functional smart TV), and the like. It should be noted that the communication terminals 10a, 10b, 10c and etc. may be hereinafter collectively referred to as "communication terminal(s) 10."

With this game system, the game server 20 is configured to be able to communicate with the communication terminal 10 as a client. The game server 20 provides gaming service with the communication terminal 10. The game server 20 is embedded with an application operable on a web browser as a game application in the game system. The database server 30 stores a variety of information for executing the games as described below. The database server 30 is connected to the game servers 20 by means of a wired connection for example for reading and writing the information.

The communication terminal 10 includes a web browser that is able to display a web page provided by the game server 20. A user plays a game by performing an operation on the web page displayed on the communication terminal 10.

In addition to the game server 20, an authentication server may be provided for authenticating respective users of the communication terminals 10, although not illustrated in FIG. 1. Further, if providing a plurality of the game servers 20 for receiving accesses from a large number of the communication terminals 10, a load balancer may be provided for regulating loads among the plurality of game servers 20. Furthermore, the game server 20 may be configured as a single server device or as a plurality of server devices to which functions are distributed.

(1-2) Communication Terminal Configuration

The communication terminal 10 will be hereinafter explained with reference to FIGS. 2A, 2B, and 3.

Figure 2A:
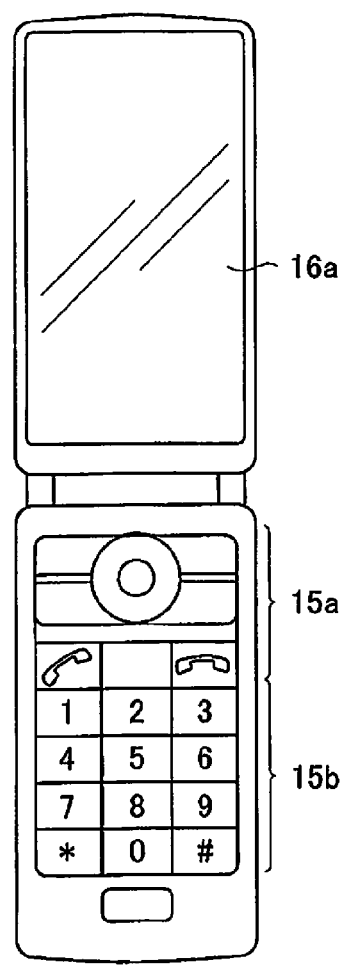
FIG. 2A illustrates an external appearance example of a communication terminal according to the first embodiment.
Figure 2B:
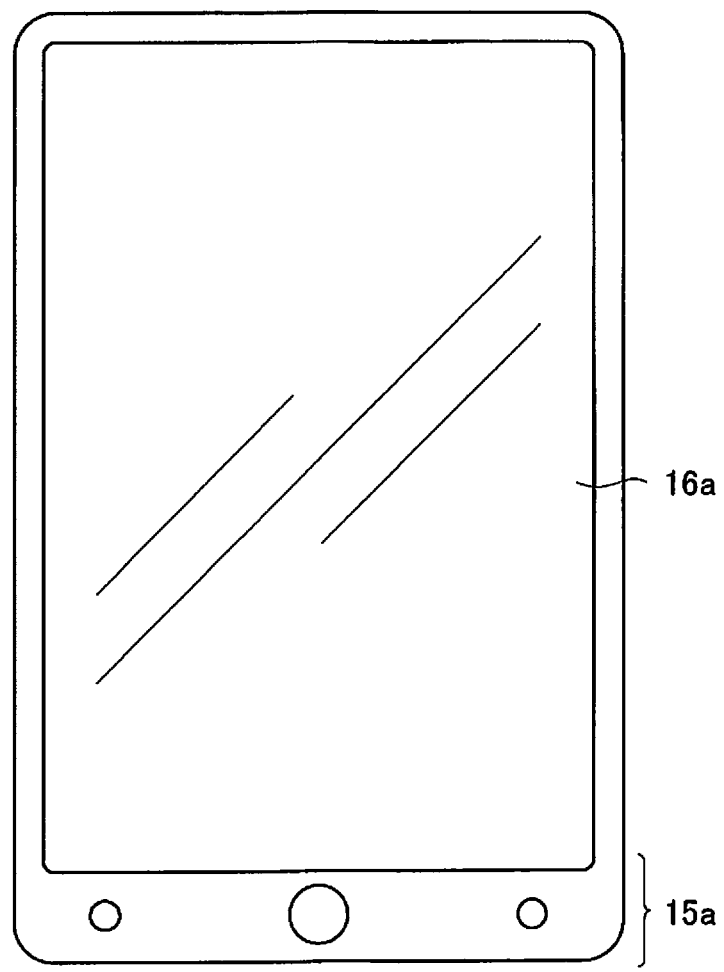
FIG. 2B illustrates an external appearance example of a communication terminal according to the first embodiment.

FIGS. 2A and 2B illustrate exemplary appearances of the communication terminal 10. FIG. 2A illustrates a communication terminal with a button input system such as, for example, a foldable communication terminal (mobile telephone) and the like. FIG. 2B illustrates a communication terminal with a touch panel input system such as, for example, a smartphone. FIG. 3 is a configuration block diagram of the communication terminal 10.

Figure 3:
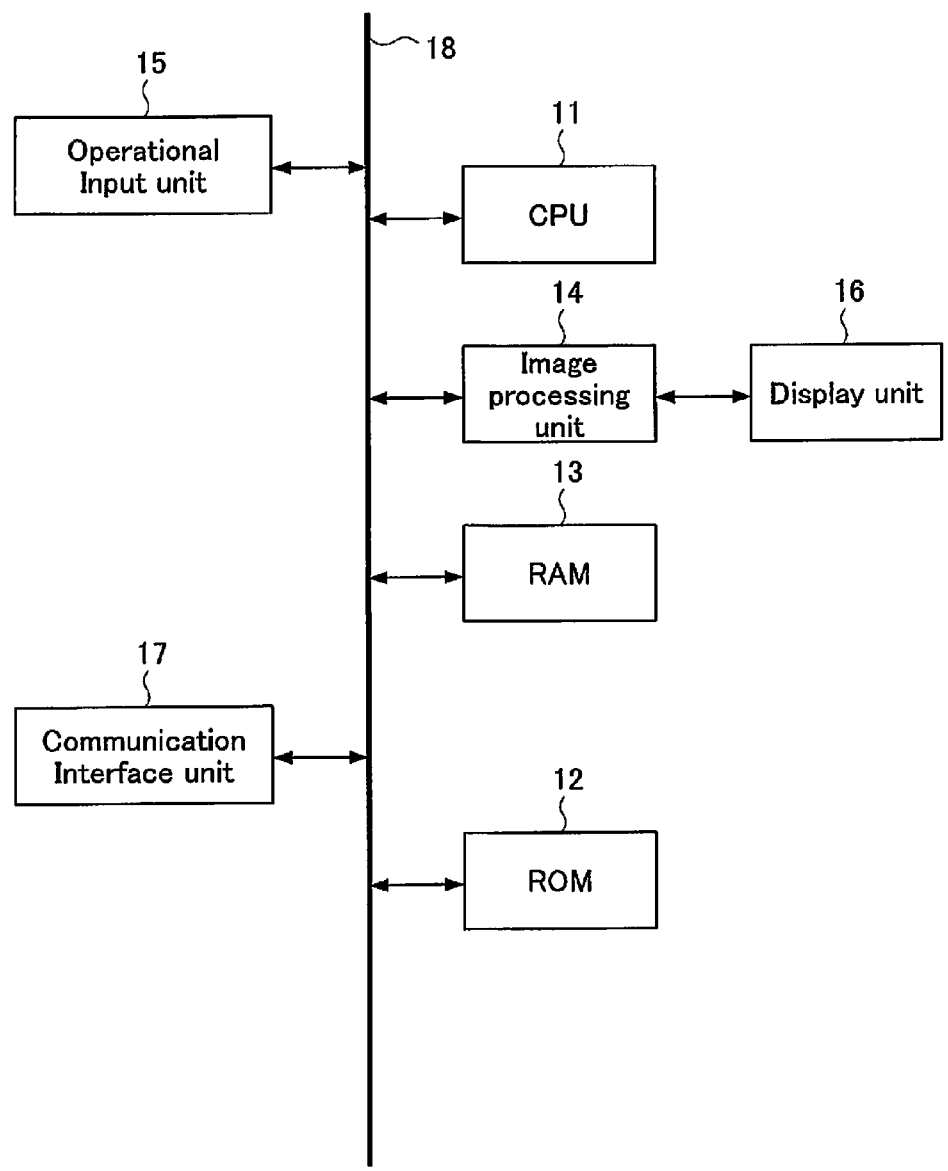
FIG. 3 is a block diagram of a configuration of a communication terminal according to the first embodiment.

As represented in FIG. 3, each communication terminal 10 includes a central processing unit (CPU) 11, a read-only memory (ROM) 12, a random access memory (RAM) 13, an image processing unit 14, an operational input unit 15, a display unit 16, and a communication interface unit 17 as a signal reception unit. Further, each communication terminal 10 includes a bus 18 for transmitting control signals or data signals among the components.

The CPU 11 loads a web browser stored in the ROM 12 into the RAM 13 and runs the web browser therein. The CPU 11 acquires data for displaying a web page from the game server 20 through the communication interface unit 17 on the basis of an appropriately specified uniform resource locator (URL) that is inputted by a user using the operational input unit 15 and the like. The acquired data is data of objects such as images associated with a hypertext markup language (HTML) document and the HTML document (hereinafter collectively referred to as "HTML data" on an as-needed basis). The CPU 11 then interprets the acquired HTML data. It should be noted that each communication terminal 10 may be embedded with a variety of plug-ins for extending browsing functions of the web browser.

In acquiring the HTML data, the CPU 11 transmits an access request message to the game server 20 through the communication interface unit 17. The access request message herein includes either a preliminarily registered user ID (user identification information) or a user ID inputted through the operational input unit 15.

The web browser displays on the display unit 16 a web page provided by the game server 20 through the image processing unit 14 on the basis of the acquired HTML data. Further, when either a Hyperlink or a button on the web page is selected by a user operating the operational input unit 15, the web browser sends a request to the game server 20 (that is, a request for updating a web page; HTTP request) to transmit new HTML data for displaying the web page in accordance with the selection.

The image processing unit 14 displays a web page on the display unit 16 on the basis of image data for display to be provided from the CPU 11 as an analysis result of the HTML data. For example, the display unit 16 is a liquid crystal display (LCD) monitor including thin-film transistors arranged in a matrix manner on a pixel-by-pixel basis. The display unit 16 displays the image of the web page by driving the thin-film transistors on the basis of the image data for display on a display screen 16a.

In the case in which the mobile terminal 10 is a communication terminal to which a button input method (see FIG. 2A) applies, the operational input unit 15 is equipped with a button group 15a and a button group 15b. The button group 15a includes a plurality of operational input buttons such as a directional instruction button and a confirmation button for receiving user operational inputs. The button group 15b includes a plurality of operational input buttons such as an alphanumeric keypad and the like. The operational input unit 15 also includes an interface circuit for recognizing pressing (operational) inputs of the buttons and outputting the inputs to the CPU 11. For example, the direction instructional button is provided for instructing the CPU 11 to scroll and display a web page displayed on the display unit 16. The confirmation button is provided for instructing the CPU 11 to select one of a plurality of hyperlinks or buttons displayed on a web page. The selected hyperlink or button may be activated (e.g., highlighted). When the communication terminal 10 is a small portable terminal, the aforementioned buttons are preferably disposed on the front face of the communication terminal 10 to allow a user to easily operate (click) the buttons with the thumb of the hand holding the communication terminal 10. In the example illustrated in FIG. 2A, the button group 15b is arranged below the button group 15a and includes a plurality of operational input buttons depicted as "0" to "9", "*", "#" (an alphanumeric keypad).

In the case in which the mobile terminal 10 is a communication terminal to which a touch panel input method (see FIG. 2B) applies, the operational input unit 15 receives touch panel method inputs inputted by mainly touching the display screen 16a with a finger or a pen. The touch panel input method may be a known method such as a capacitance method. As illustrated in FIG. 2B, the communication terminal 10 may be provided with a button group 15a despite having the touch panel input method.

In the case in which a button input method applies to the mobile terminal 10 for example, a selection operation of a button on a web page displayed on the communication terminal 10 is performed by the following steps: selecting a button with a pressing operation of the direction instructional button and subsequently confirming the selected button with a pressing operation of the confirmation button. In the case in which a touch panel input method applies to the mobile terminal 10 for example, the selection operation is conducted by indicating (touch operation) with a finger or pen a position of a button on the display screen 16a on which the web page is displayed.

(1-3) Game Server Configuration

Figure 4:
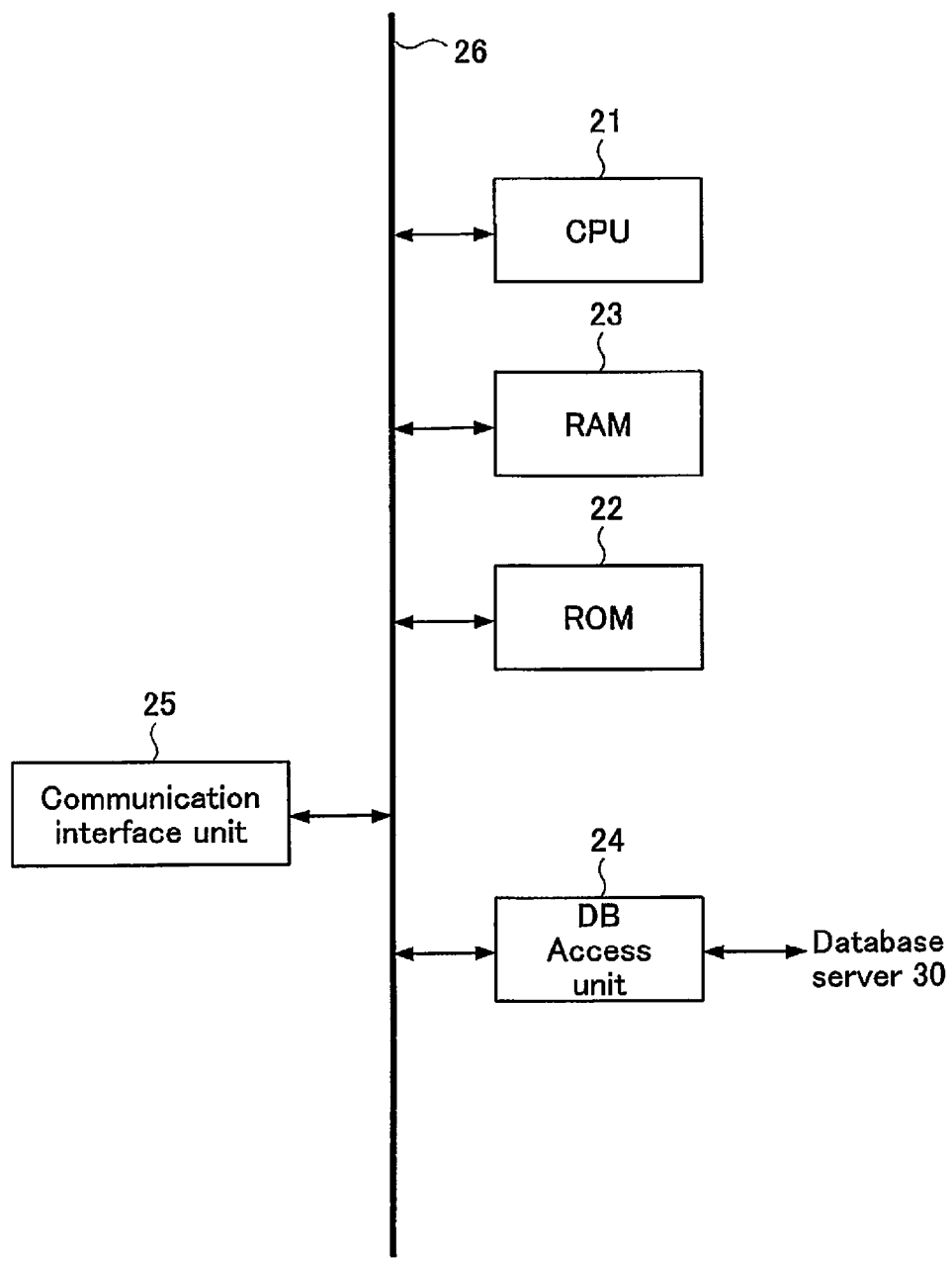
FIG. 4 is a block diagram of a configuration of a game server according to the first embodiment.

The configuration of the game server 20 will be explained with reference to FIG. 4.

For example, the game server 20 manages a website of a game including a plurality of hierarchically structured web pages. The game server 20 provides a web service of the game to the communication terminals 10. As illustrated in FIG. 4, the game server 20 includes a CPU 21, a ROM 22, a RAM 23, a database (DB) access unit 24, and a communication interface unit 25. Further, the game server 20 includes a bus 26 for transmitting control signals or data signals among the components. It should be noted that the game server 20 may have the same hardware structure as general-purpose web servers.

The ROM 22 stores an application program that provides the service of displaying a HTML document and objects such as images (i.e., displaying a web page) to the web browser of the communication terminal 10 as a client. A variety of data referenceable by the CPU 21 is stored in the ROM 22 in addition to the application program.

The CPU 21 loads a game program stored in the ROM 22 into the RAM 23 and runs the loaded game program. The CPU 21 also performs a variety of processing through the communication interface unit 25.

For example, the CPU 21 transmits HTML data to the communication terminal 10 through the communication interface unit 25. Moreover, the CPU 21 performs authentication processing when the game server 20 performs authentication processing of the user of the communication terminal 10.

The CPU 21 performs processing in accordance with the hyperlink or button selected by the user on the web page displayed on the communication terminal 10 through the communication interface unit 25. The processing includes, for example, transmitting new HTML data, calculating or data processing in the game server 20.

The database access unit 24 is an interface used when the CPU 21 performs data reading and data writing with respect to the database server 30.

(1-4) Database Server Configuration

The database server 30 can be realized by a general-purpose storage such as a high-capacity hard disc drive, a redundant array of inexpensive disks (RAID) or other form of device. Databases inside the database server 30 are configured to allow reading and writing of data by the CPU 21 through the database access unit 24 of the game server 20.

Figure 5:
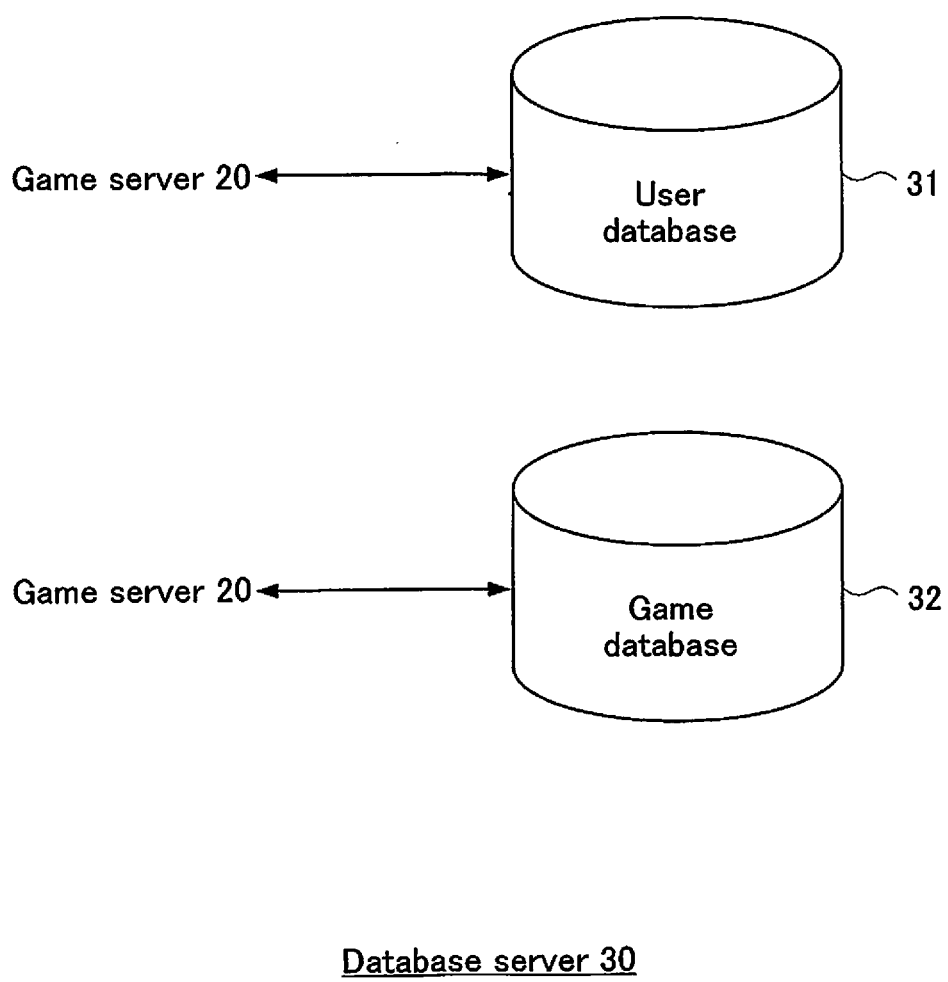
FIG. 5 is a block diagram of a configuration of a database server according to the first embodiment.

FIG. 5 illustrates an example of a database server 30 configuration. As illustrated in FIG. 5, the database server 30 includes a user database 31 and a game database 32.

The game executed by the game server 20 of the present embodiment is not limited so long as it is a game that simulates a sport or an amusement in the real world. For convenience sake of the following explanation, a baseball-type digital card game will be considered as an exemplary game that is realized by the game server 20.

The baseball-type digital card game is configured such that a user collects player cards to form a team of the user. Each of the player cards correspond a baseball player. The user plays a match with the other user's team or plays a league match for a skill level corresponding to the user. Processing that is included in the baseball-type digital card game are: scouting processing for searching player cards to form a user's own team, drawing processing for allowing to obtain player cards by drawing, and enhancement processing for enhancing ability of a specific player card by combining more than two player cards, etc.

Functions embedded for the baseball-type digital card game will be described later.

FIG. 6 illustrates an exemplary configuration of a user database 31 that is applied to the baseball-type digital card game. In this example, the user database 31 includes for each user ID (user identification information): User Name/Display Image, Team, Skill level, Action points, Operation points, Enhancement points, Cheering points, Number of players, Friends, Image data of owned cards, and Parameters of owned cards. Information included in the user database 31 may be updated.

In the following explanation, data for each user ID or for each user name (explained below) that identifies a user included in the user database 31 is referred to collectively as "user data." The data of the fields that configure the user data are described below.

—User Name/Display Image

"User Name/Display Image" represents a user name and a display image displayed for identifying a user of the communication terminal 10 while executing the game. The user name is a text of a certain length or less specified in advance by the user. The display image is, for example, an avatar image selected in advance by the user. The user name is a name to identify a user in a network environment (or a game community) provided by the game server 20.

—Team

"Team" is specified by a user at user registration in the baseball-type digital card game. In this game, P_League that includes six teams P1 to P6 and Q_League that includes six teams Q1 to Q6 are prepared. The user selects any one of these twelve teams at the user registration.

—Skill Level

"Skill level" indicates a skill level of a user in the game. The skill level is a value that ranges from level 1 (Lv1) to level 100 (Lv100) for example.

—Action Points

"Action points" are points that are necessary for a user to perform scouting in the baseball-type digital card game. The action points is a value that decreases by performing scouting and recovers (increases) each time a certain period of time elapses.

—Operation Points

"Operation points" are points that are necessary for a user to play a match on the game. The operation points is a value that decreases by playing a match against the other user and recovers (increases) each time a certain period of time elapses.

—Enhancement Points

"Enhancement Points" are points that are necessary for a user to perform enhancement of a player card in the baseball-type digital card game. The enhancement points is a value that decreases by performing enhancement of a player card, and recovers (increases) if the user wins the match against the other user or each time a certain period of time elapses.

—Cheering Points

"Cheering points" are points that a user obtains by sending a cheering message to the user's friend in the baseball-type digital card game.

—Number of Players

"Number of players" is the maximum number of players that a user can own. The maximum number of players (60 for example) is predetermined.

—Friends

"Friends" indicates user ID(s) of friends of a user.

—Image Data of Owned Cards

"Image Data of Owned Cards" represents data that includes images of player cards that a user owns in the baseball-type digital card game.

—Parameters of Owned Cards

"Parameters of Owned Cards" include data that indicates ability values of respective player cards. For example, as illustrated in FIG. 6, the parameters may include ability values such as "batting ability", "running ability", and "fielding ability." In the example of FIG. 6, each ability value is in a range of 0 to 1000, and a higher ability value of a player card indicates that the player card is more capable. In FIG. 6, "batting ability", "running ability", and "fielding ability" are exemplified as indexes of ability. "Ball speed", "ball control" and "stamina" and the like may be used alternatively for example if a player is a pitcher.

Referring now back to FIG. 5, the game database 32 stores and updates information with regard to configuration of the game that the game server 20 executes and information with regard to game results based on access from the game server 20. The information with regard to game results may include various types of information according to nature of the game. In the baseball-type digital card game for example, the information with regard to game results include: game results between different user IDs (score, etc.), league matches results among users having a specific skill level (score, ranking, etc.), and score results in mission processing that is described later.

(1-5) Game According the Present Embodiment

Figure 7:
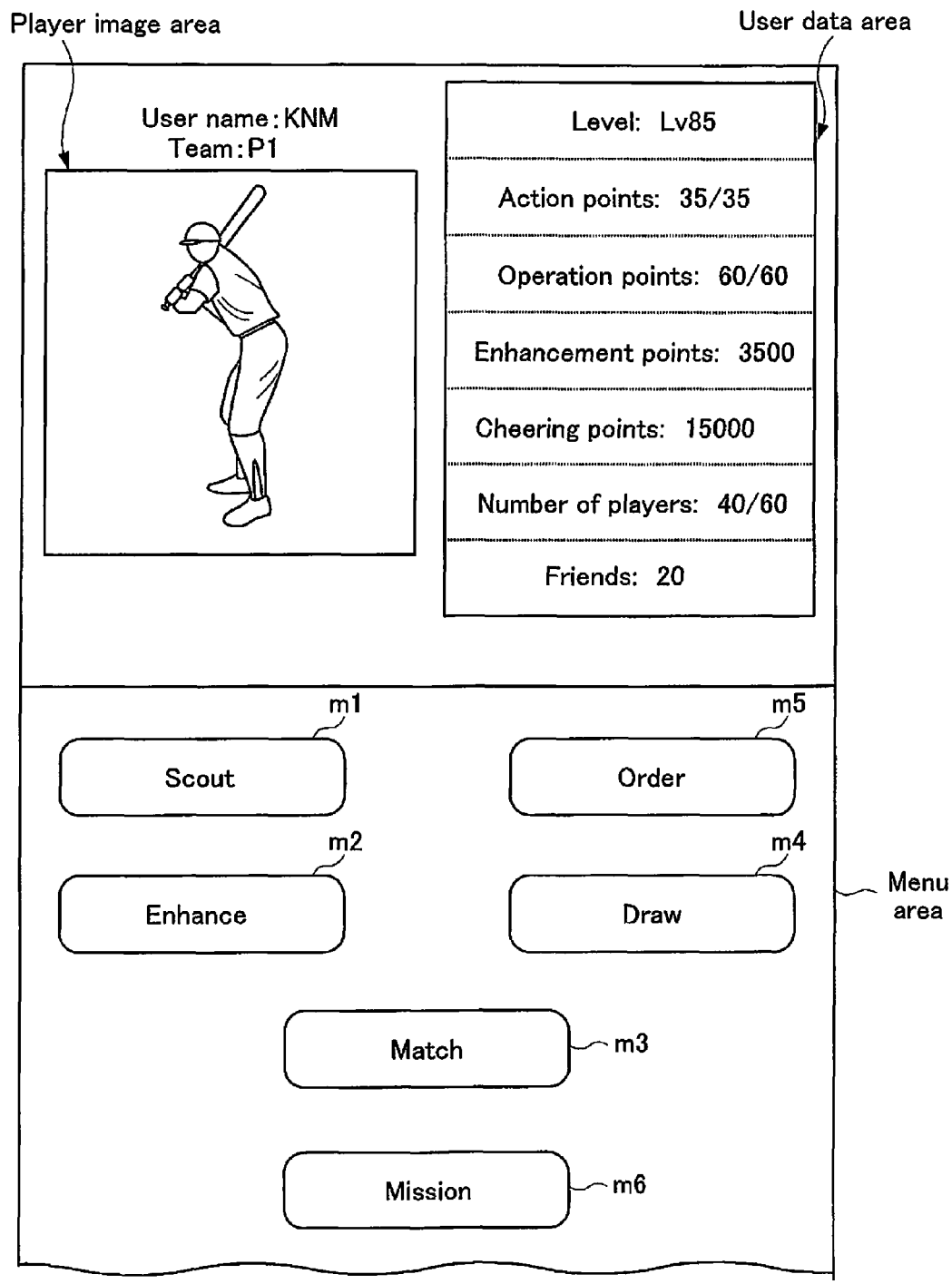
FIG. 7 illustrates a display screen of a communication terminal that displays a top page.
Figure 8:
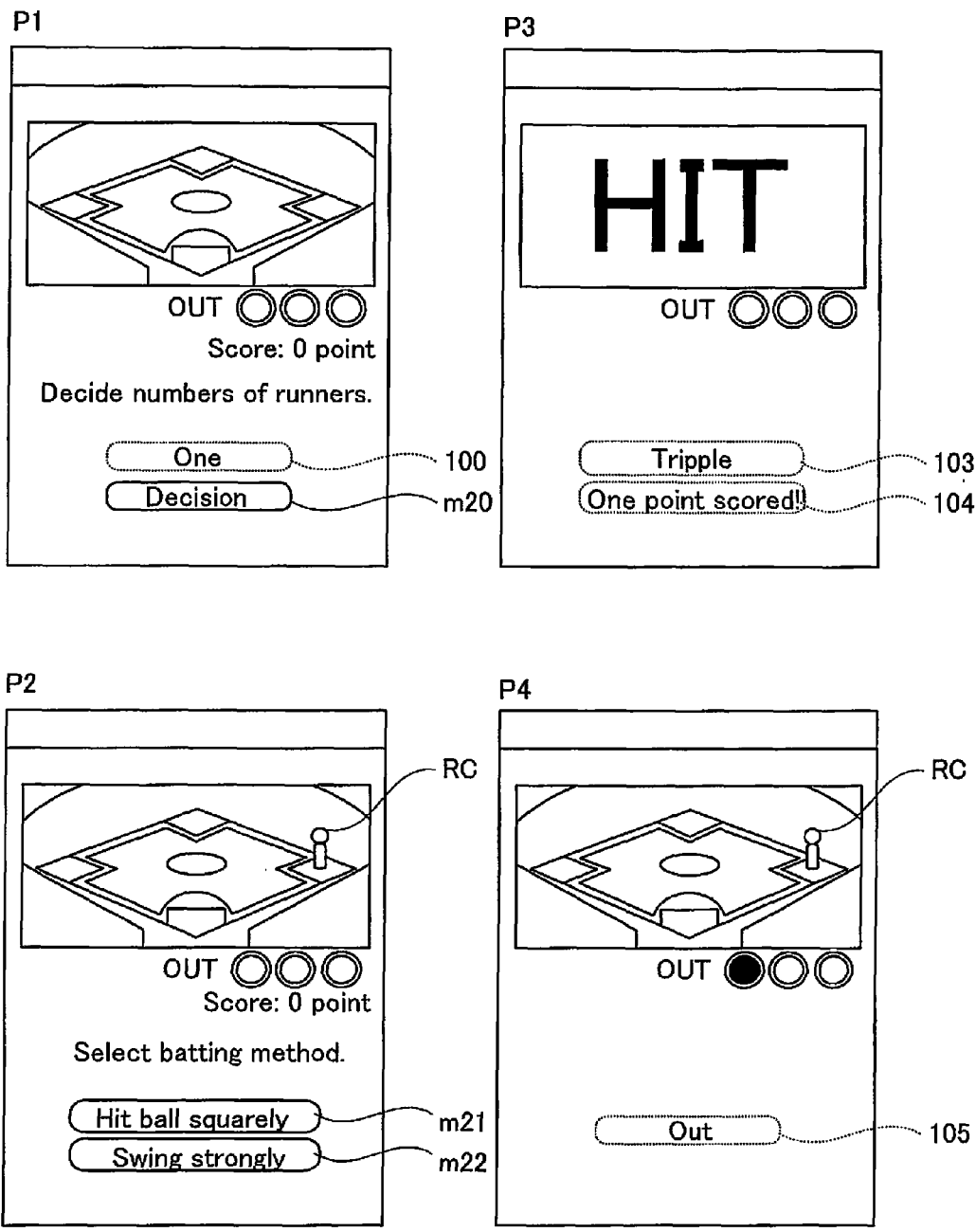
FIG. 8 illustrates an example of a web page for the game according to the first embodiment.

Specifically, mission processing will be described hereinafter among a plurality of processing steps provided in the present embodiment with reference to FIGS. 7 and 8. FIG. 7 illustrates an example of a top page that is displayed on a communication terminal 10 in the game according to the present embodiment. FIG. 8 illustrates an example of a web page that is displayed on a communication terminal 10 in the mission processing.

The top page illustrated in FIG. 7 is a web page for respective user IDs. The top page illustrated in FIG. 7 includes a user data area, a player image area, and a menu area.

The user data area is an area in which respective fields of user data for a user ID to be processed is displayed (see FIG. 6). The respective fields are: User name, Team, Skill level (Level), Action points, Operation points, Enhancement points, Cheering points, Number of players, and Friends.

The player image area is an area in which image of a player card is displayed. The displayed player card is specified by a user among a plurality of player cards that are included in the user data for the user ID to be processed.

The menu area is an area in which a button m1 ("Scout"), a button m2 ("Enhance"), a button m3 ("Match"), a button m4 ("Draw"), a button m5 ("Order"), and a button m6 ("Mission") that correspond to a plurality of processing steps are displayed as a basic menu. Respective buttons m1 to m6 correspond to scouting processing, enhancement processing, match processing, drawing processing, order processing, and mission processing. That is, each of the plurality of processing steps performed in the game is allocated to a corresponding button among the plurality of the buttons. The buttons are located on predetermined positions in the web page that is displayed on the communication terminal 10. The order processing, which corresponds to the button m5, includes switching an order of player cards (a batting order and defense positions of players, for example) and exchanging a player card set in a starting order for a player card set as a substitute.

With the mission processing according to the present embodiment, a user obtains a benefit if total points that the user scores reaches certain points (ten, for example) or more while repeating hitting events before three outs are recorded. In the present embodiment, it is configured such that a result of a single hitting event is determined with a single pitch and an on-base situation of runner character(s) is set for each hitting event. A condition for obtaining the benefit may be arbitrarily defined. For example, the benefit may be obtained if at least one point is scored before one out is recorded. The benefit may be obtained if total points that the user scores reaches certain points or more before three outs are recorded. The benefit that the user obtains may be arbitrarily defined. For example, the benefit that the user obtains may be: a certain amount of cheering points or enhancement points, or a player card that is difficult to obtain in the game (that is, a rare card).

In the game of the present embodiment, the mission processing illustrated in FIG. 8 is performed in response to a selection operation to the button m6 illustrated in FIG. 7. First, as illustrated in FIG. 8, the updated web page P1 is displayed in response to the selection operation to the button m6. The web page P1 of FIG. 8 includes: an area in which a field image having a home base and first to third bases is displayed; a text indicating information about the score at present; a display area 100 in which a text that is displayed for indicating numbers of runners on the bases (either of 0, 1, 2, or 3) are displayed rapidly by turns; and a button m20 for determining a number of runners on the bases.

In the web page P1 illustrated in FIG. 8, numbers (that are included in the text) are displayed rapidly by turns. If a selection operation is performed to the button m20, any one of the numbers is selected. Then, a number of runner(s) on the bases is determined, and base(s) on which the runner(s) are positioned are determined. Resultantly, the updated web page P2 is displayed as illustrated in FIG. 8. A displaying method in determining the number of runners) and the base(s) of the runner(s) is not limited to one described above in which the text are displayed rapidly by turns. Alternatively, it may be configured such that displayed images or texts indicating respective situations are rapidly changed and one of the situations may be determined. The respective situations include: a situation in which one runner is positioned on the bases; a situation in which two runners are positioned on the bases; a situation in which three runners are positioned on the bases; and a situation in which no runners are positioned on the bases (that is, bases empty). The number of runner(s) and the base(s) on which the runner(s) are positioned may be randomly determined depending on time when the button m20 is operated, or may be determined according to a certain rule. The web page P2 of FIG. 8 illustrates an example in the case in which one runner (runner character RC) is positioned on the first base. Note that an on-base situation of the runner character may be recognized by a user with text information or voice information such as "Runner on third base with one out" or the like. The web page P2 of FIG. 8 includes: a message that causes a user to select a batting method; a button m21 for selecting "Hit ball squarely" as batting method; and a button m22 for selecting "Swing strongly" as batting method. In this case, with the bases loaded for example, the user can select either "Hit ball squarely" to surely score a small amount of points or "Swing strongly" to try to score a large amount of points.

If the button m21 or the button m22 is selected by the user, a hitting event is generated with a batting method selected by the user and a result ("Hits" or "Outs") of the hitting event is determined based on a given or a random probability. If the result of the hitting event is "Hits", then a content of the hits, that is single, double, triple, or homerun, is determined based on a given or a random probability.

If the result of the hitting event is "Hits", the updated web page P3 is displayed as illustrated in FIG. 8. The web page P3 of FIG. 8 illustrates an example in which a content of the hits is triple. The web page P3 of FIG. 8 includes: an area 103 in which a text indicating the content (Triple, for example) of the "Hits" is displayed; an area 104 in which a text indicating point(s) scored with the content (One point, for example) of the hits is displayed; and the like. That is, triple is determined as the content of the hits under the on-base situation in which a runner character RC is positioned on the first base, and consequently one point is scored. The scored point is added to the total score.

Here, if the total score reaches certain points, the user obtains a benefit and the mission processing terminates. If the total score does not reach the certain points, processing for determining the number of runners is performed once more in the web page P1 illustrated in FIG. 8. In this case, the total score and the number of outs are held.

On the other hand, if the result of the hitting event is "Outs", a number of outs are added by one and the updated web page P4 is displayed as illustrated in FIG. 8. The web page P4 of FIG. 8 illustrates an example in which a situation is changed from no outs to one out. The web page P4 of FIG. 8 includes an area 105 in which a text indicating a result of the batting event (Out, for example), etc. The web page P4 of FIG. 8 is configured such that the number of outs at present are recognizable by displaying one mark with its color changed among three marks that represent the number of outs.

If the number of outs reaches three (that is, three outs), the mission processing terminates. If the number of outs does not reach three, processing for determining the number of runners is performed once more in the web page P1 illustrated in FIG. 8. In this case, the total score and the number of outs are held.

(1-6) Overview of Functions of Game Control Device

Figure 9:
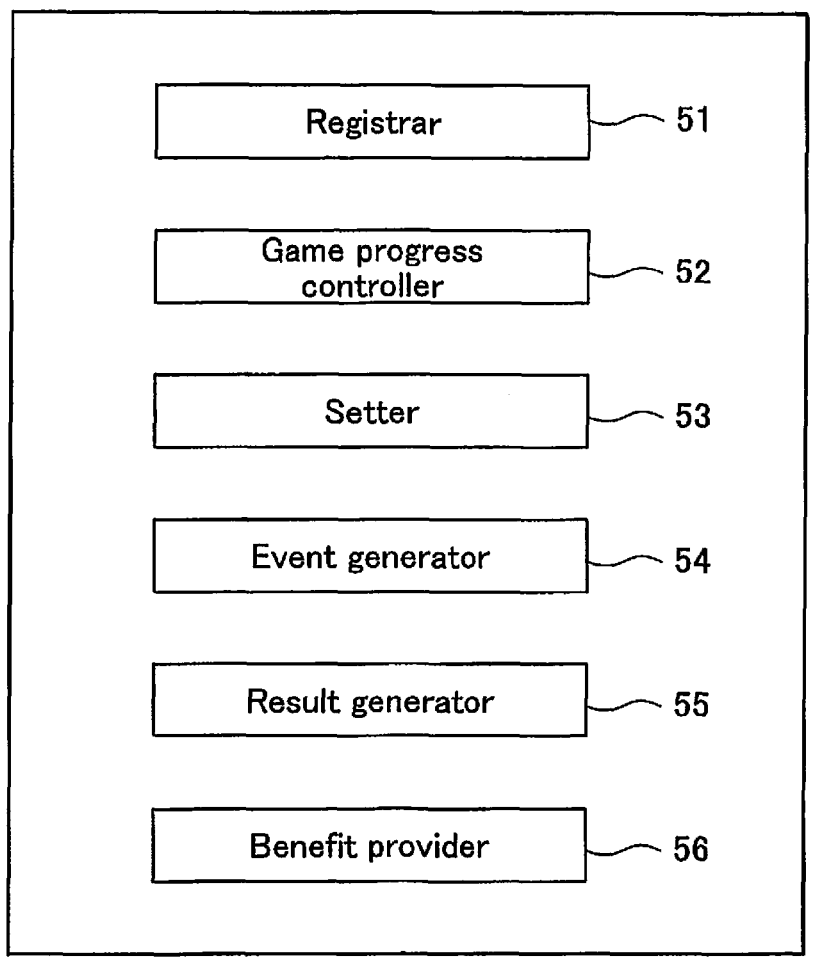
FIG. 9 is a functional block diagram for explaining functions that play main rolls in the game control device according to the first embodiment.

In the present embodiment, the game control device is configured, for example, by the game server 20 and the database server 30. Hereinafter, functions performed by the game control device of the present embodiment will be described with reference to FIG. 9 in the case in which the above-described baseball-type digital card game (which may be referred to as "game" hereinafter) is applied. FIG. 9 is a functional block diagram for explaining functions playing main rolls in the game control device according to the present embodiment.

Note that setter 53, event generator 54, and result generator 55 corresponds to main elements of the present invention. The other components are not mandatory elements for the present invention, but they are elements that make the present invention more preferable.

In the following explanation, marks and buttons and the like displayed on the web pages displayed on the communication terminal 10 are arranged in preferable positions on the web pages. The positions on the display screen of the buttons and marks and the like made visible by the communication terminal 10 may be changed with a scrolling operation of the web page by the user using a direction instructional button or touch panel operation.

A registrar 51 includes a function for recognizing a user request and executing registration processing (that is, user registration) in response to an operational input to the communication terminal 10 on a web page for example that is provided to the communication terminal 10.

The function of the registrar 51 may be realized, for example, as described below. The CPU 21 of the game server 20 receives a registration request message from the communication terminal 10 through the communication interface unit 25. The web page provided by the game server 20 may be configured so that a registration request message is automatically generated by a certain operation (e.g., a selection of a certain button, or a text input and the like) to the communication terminal 10 on the web page. Information (e.g., an IP address or an email address and the like) for identifying the communication terminal 10 that is the transmission source may be included in the registration request message. Alternatively, in the case in which the user plays the other game(s) from the same service provider, the registration request message may include the user ID of that user.

If the CPU 21 receives the registration request message in which a user ID is not included, the CPU 21 issues a new user ID and processes the new user ID, and then transmits a message to the communication terminal 10 indicating the fact that the registration processing has been completed. If the CPU 21 receives the registration request message in which a user ID is included in the registration request message, the CPU 21 processes that user ID, and then transmits a registration completion message to the communication terminal 10.

When the registration is completed, the CPU 21 prepares user data corresponding to the user ID and stores the user data in the user database 31.

The registrar 51 may also register a user ID in association with the other user ID upon an application based on the user ID. That is, the registrar 51 registers the other user ID (namely, the other user) as a "friend" upon an application based on the user ID. Note that, in the following explanation, a relationship between user IDs has the same meaning as a relationship between users that corresponds to the user IDs. The registrar 51 is an example of the associator of the present invention.

In this case, the registrar 51 will be realized for example as described below. The CPU 21 of the game server 20 receives an application message (application) that specifies a user ID (or the corresponding user name) to desirably be friends with, from the communication terminal 10 of the user corresponding to a certain user ID through the communication interface unit 25. The transmission of the application message may be preset as a function of the web page provided to the communication terminal 10 of the user. Upon receiving the application message, the CPU 21 transmits HTML data to the communication terminal 10 corresponding to the user ID, when access occurs based on the user ID included in the application message. The transmitted HTML data is for displaying a web page to request for replying whether or not the application on the basis of the other user ID is approved. The CPU 21 registers both users as friends if a message of approval of the application is returned. Specifically, the CPU 21 writes the data in the "friend" field (see FIG. 6) of the user data of the two corresponding user IDs in the user database 31.

The game progress controller 52 progresses the game by transmitting HTML data for successively updating web pages displayed on the communication terminal 10 in response to operations by the user to the communication terminal 10. As described above, processing for the baseball-type digital card game includes the following processing to progress the game.

—Scouting Processing

The scouting processing is processing for allowing a user to search player cards to form the user's own team. The action points are consumed by performing scouting while the enhancement points increases.

—Enhancement Processing

The enhancement processing is processing for allowing a user to enhance ability of a specific player card by combining more than two player cards.

—Match Processing

The match processing is processing for allowing a user's team to perform a baseball match against the other user's team. The operation points are consumed by performing the baseball match while the enhancement points increases if the user wins the match.

—Drawing Processing

The drawing processing is processing for allowing a user to obtain player cards by drawing with the cheering points consumed.

—Order Processing

The order processing is processing for allowing a user to switch an order of player cards and to exchange a player card set in a starting order for a player card set as a substitute.

—Mission Processing

The mission processing is processing for allowing a user to score points by selecting a batting method based on an on-base situation of runner(s) as described with reference to FIG. 8.

In realizing the function of the game progress controller 52, the CPU 21 of the game server 20 allocates either processing for progressing the game to each button that is displayed in a web page. When a button is selected on the web page that is displayed on the communication terminal 10, the CPU 21 receives information with regard to the selected button from the communication terminal 10. The CPU 21 then performs processing that is allocated to the selected button based on the information received.

The game progress controller 52 causes the communication terminal 10 to display a plurality of buttons. Each of the plurality of processing steps that are performed in the game is allocated to a corresponding button among the plurality of buttons. Specifically, the CPU 21 generates HTML data and transmits the same to the communication terminal 10. The generated HTML data is for displaying the web page that includes the plurality of buttons. As described above, the points in the game are consumed in response to execution of each of the scouting processing, the enhancement processing, the match processing, and the drawing processing.

The function of the game progress controller 52 will be realized as described below when the top page of FIG. 7 is displayed on the communication terminal 10 of the user for example. The CPU 21 of the game server 20 accesses to the user database 31 through the database access unit 24, and reads out data of respective fields included in the user data area and image data of a player card to be displayed in the player image area. Then, the CPU 21 generates HTML data such that the top page of FIG. 7 is displayed, and transmits the HTML data to the communication terminal 10. The generated HTML data differs for respective users (that is, respective user IDs). The communication terminal 10 interprets the HTML that it receives, and displays the image of the top page on the display unit 16 (display screen 16a).

The game progress controller 52 initiates execution of any processing of the scouting processing, the enhancement processing, the match processing, and the drawing processing in response to a selection operation of the user to the communication terminal 10. That is, respective processing in the game is started by the selection operation to either of the plurality of buttons. Preferably, each processing is performed such that a web page is updated for each processing so as to include a plurality of hierarchically structured buttons.

[Match Processing]

The game progress controller 52 includes a function for performing the match processing in which a user plays a baseball match with the other user's team.

Figure 10:
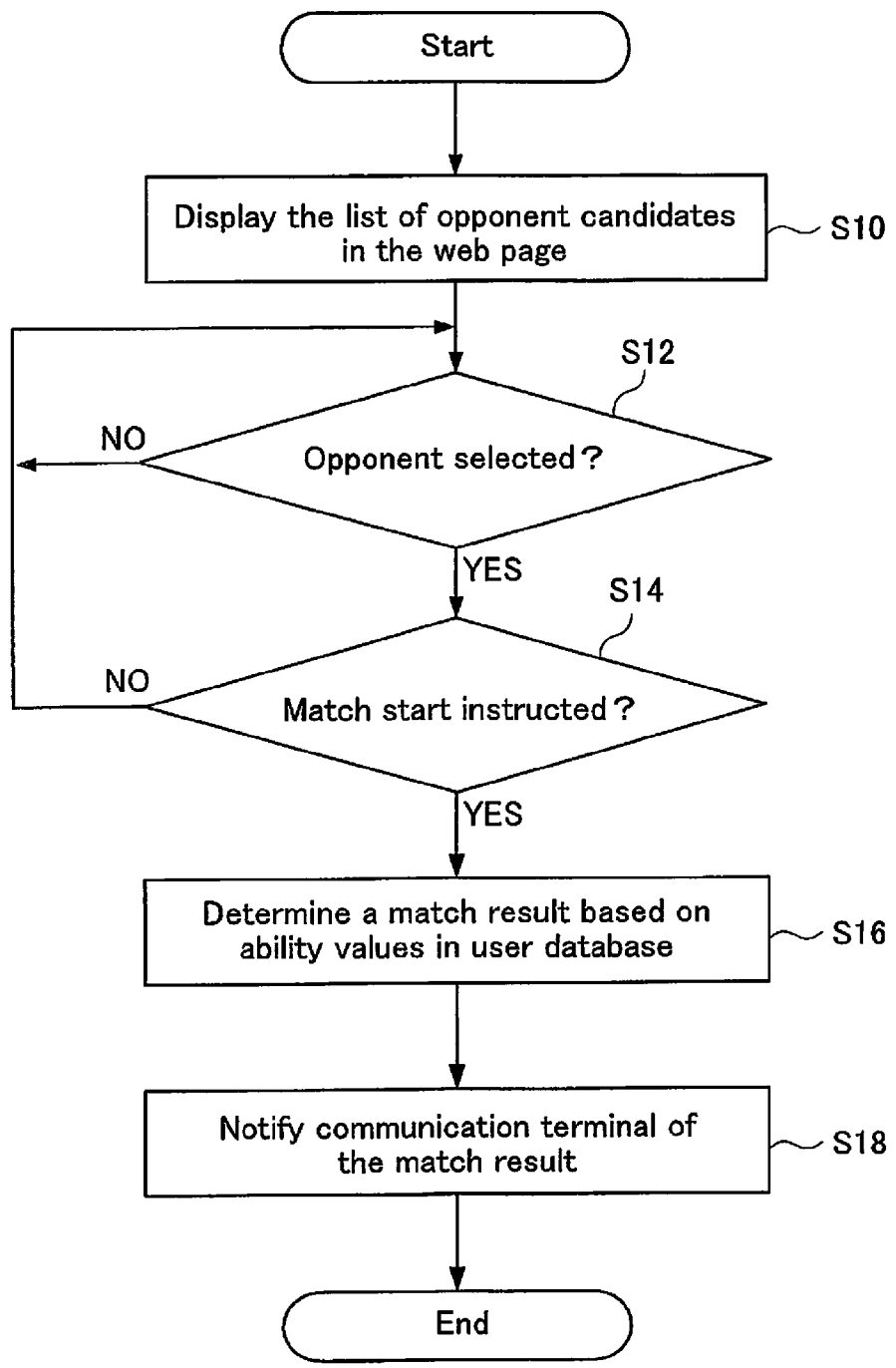
FIG. 10 is an exemplary flowchart for performing match processing.
Figure 11:
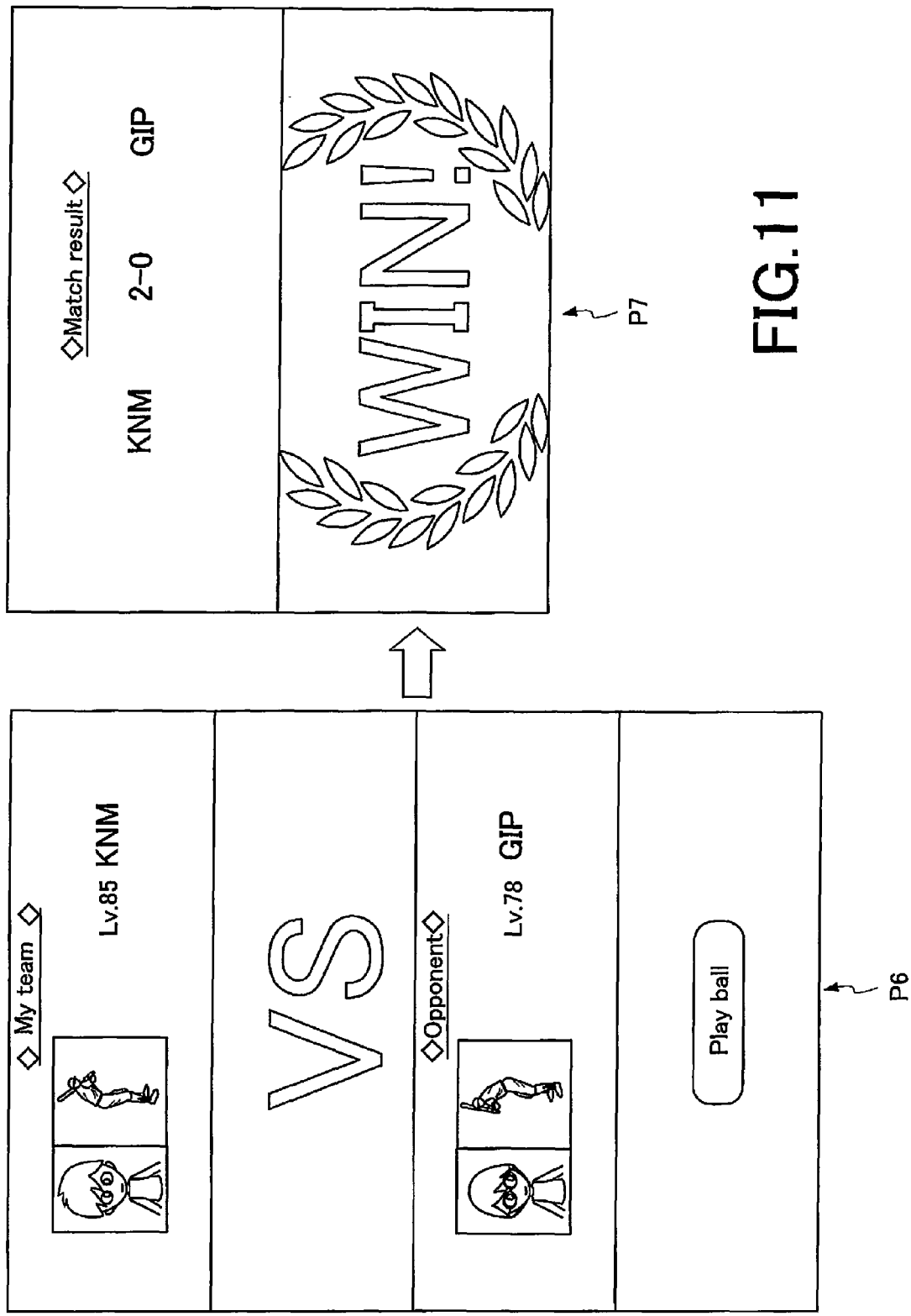
FIG. 11 illustrates an example of a web page when the match processing is performed.

The function of the game progress controller 52 will be realized as described below with reference to FIGS. 10 and 11. FIG. 10 is a flowchart indicating a series of processing that is performed mainly by the CPU 21 of the game server 20. The flowchart of FIG. 10 is for realizing the function for performing the match processing of the game progress controller 52. FIG. 11 illustrates a web page that is displayed on the communication terminal 10 of the user. The web page of FIG. 11 is realized by the game progress controller 52.

A selection operation is performed to the button m3 (see FIG. 7) on the top page that is displayed on the communication terminal 10 of a user that corresponds to a user ID. When receiving a result of the selection operation, the CPU 21 of the game server 20 randomly determines a plurality of opponent candidates of that user ID among the other user IDs that are included in the user database 31. At this time, a skill level of the opponent candidates may be preferably the same as the skill level of the user that select the button m3. The CPU 21 transmits HTML data to the communication terminal 10 to the user (Step S10). The transmitted HTML data is for displaying a web page that allows the user to select any opponent candidate from the list of the plurality of opponent candidates. If an operation for selecting any opponent candidate from the list of the plurality of opponent candidates is performed by the user (Step S12: YES), a web page P6 is displayed as illustrated in FIG. 11. The web page includes the selected opponent and a button that causes a user to instruct a start of a match. Here, if the user selects a button of "Play ball" (Step S14: YES), the CPU 21 performs processing for determining a match result. In determining the match result, the CPU 21 accesses to the user database 31 through the database access unit 24. Then, if operation points of the user ID to be processed are more than a predetermined points that are required to play the match, the CPU 21 decreases the operation points by that predetermined points and reads out parameters indicating abilities of a plurality of player cards that correspond to two user IDs who performs the match. The CPU 21 determines the match result between the users who play the match (Step S16). If any opponent is not selected in Step S12 (Step S12: NO), the CPU 21 performs the processing of Step S12 once more. If the button of "Play ball" is not selected (Step S14: NO), the CPU 21 performs the processing of Step S12 once more.

Any suitable method can be employed as a method of determining the match result as long as the parameters of player cards affect win/loss of the match in the method. For example, based on comparison between ability values of player cards two user as opponents own, one of the two users with a greater ability value may be configured to win the match with higher probability (e.g., a predetermined percentage range of 60-90%). The winning percentage may be set to be higher in proportion to magnitude of difference between ability values. When there are plural ability value fields as illustrated in FIG. 6, it is possible to set a comprehensive ability value for the comparison by weighting each ability value with a predetermined coefficient (e.g., weighting "batting ability", "running ability" and "fielding ability" with 0.4, 0.2 and 0.4, respectively, in the example of FIG. 6).

After determining the match result, the CPU 21 transmits HTML data to the communication terminal 10 of a user who performs a selection operation to the button of "Play ball" (Step S18). This HTML data is for displaying a web page that includes the match result in order to notify the user of the match result. It takes very short period of time (several seconds for example) from a time when the selection operation to the button "Play ball" is performed to a time when the web page including the match result is displayed. Thereby, the user recognizes the match result within a very short period of time with an easy operation. A web page P7 is an example of a web page that is displayed by the execution of the match processing. The match result including a score, etc. is displayed in the web page P7 of FIG. 11.

[Mission Processing]

As described with reference to FIG. 8, the mission processing is for allowing a user to score points by selecting a batting method based on an on-base situation of runner(s) (runner character(s) RC). The mission processing is performed by the setter 53, the event generator 54, the result generator 55, and the benefit provider 56.

The setter 53 includes a function for setting a situation in a sport or an amusement before an event on a game. Here, "event" is an event that is simulated in a game. "Event" may be arbitrarily defined so long as it could happen in a sport or an amusement in the real world. In the case of a baseball game as exemplified in the present embodiment, "event" is not limited to a hitting event as illustrated in FIG. 8, but may be a pitching event or a running event. In the case of a soccer game, "event" may be a penalty kick event or a corner kick event. "Situation in sports or amusements" in the case of a baseball game as exemplified in the present embodiment is not limited to a situation in which a runner is positioned on a base as illustrated in FIG. 8, but may be a situation in which a ball is thrown to a batter. The hitting event is an example of "event" of the present invention. The on-base situation of the runner character RC is an example of "situation in sports or amusements."

The function of the setter 53 will be realized as described below. The CPU 21 of the game server 20 generates HTML data and transmits the HTML data to the communication terminal 10 through the communication interface unit 25. This HTML data is for displaying the web page P1 illustrated in FIG. 8. When the button m20 is selected on the web page P1 of FIG. 8, the CPU 21 randomly determines a number of runner(s) and base(s) on which the runner(s) are positioned.

The CPU 21 may determine the number of runner(s) and the base(s) on which the runner(s) are positioned according to a certain rule. The CPU 21 generates HTML data for displaying the web page P2 of FIG. 8 based on the number of runner(s) (runner character(s) RC) and the base(s) on which the runner(s) are positioned. Then, the CPU 21 transmits the HTML data to the communication terminal 10.

The event generator 54 includes a function for generating a hitting event based on information of an operational input under the situation set by the setter 53. Here, "Information of an operational input" may be information indicating that an operational input is performed with regard to an external device that is accessible to the game server 20, for example.

The function of the event generator 54 will be realized as described below. When either of the button m21 or the button m22 is selected on the web page P2 illustrated in FIG. 8, the CPU 21 of the game server 20 determines an event to be generated from a hitting event corresponding to "Hit ball squarely" and a hitting event corresponding to "Swing strongly."

The result generator 55 includes a function for generating a game result based on the situation set by the setter 53 and the event generated by the event generator 54. Here, "game result" is not limited to an overall result for a game, but may be a result for a phase or a part of the game. For example, in the case of a baseball game as exemplified in the present embodiment, "game result" is point(s) that is scored in a single hitting event; however, this is merely an example of the "game result". The "game result" may be a hitting result (hits or outs) or a match result. In this embodiment, an on-base situation of runner character(s) RC is an example of "situation."

The result generator 55 determines a result (hits or outs) of a hitting event. As a method for determining the result of the hitting event, data for determination that is exemplified in FIGS. 12A and 12B may be applied. Now, with reference to FIGS. 12A and 12B, the data for determination will be described. FIG. 12A illustrates an example of data for determination that is referred to when the hitting event corresponding to "hit ball squarely" is generated. FIG. 12B illustrates an example of data for determination that is referred to when the hitting event corresponding to "swing strongly" is generated. Probability of hits or outs are set for each data for determination with regard to a number of pitches (first pitch (first at bat) to ninth pitch (ninth at bat)) and a number of outs when the hitting event corresponding to "Hit ball squarely" or the hitting event corresponding to "swing strongly" is generated. For example, when the hitting event corresponding to "hit ball squarely" is generated for a first pitch with no outs, there is probability of 95% that hits occur. On the other hand, when the hitting event corresponding to "swing strongly" is generated for a first pitch with no outs, there is probability of 70% that hits occur. It should be noted that data for determination exemplified in FIGS. 12A and 12B is merely an example of probability and may be modified as needed basis. Further, the data for determination exemplified in FIGS. 12A and 12B are configured such that three outs occurs in the ninth pitch at maximum; however, the number of pitches may not be limited.

When determining that the hitting result is hits, the result generator 55 further determines a content of the hits (either of single, double, triple, and homerun) in the hitting event. The content of the hits may be arbitrarily set for respective batting methods in the hitting event. For example, when the hitting event corresponding to "hit ball squarely" is generated, it may be configured such that: probability of single is 65%; probability of double is 20%; probability of triple is 10%; and probability of homerun is 5%. When the hitting event corresponding to "swing strongly" is generated, it may be configured such that: probability of single is 10%, probability of double is 50%; probability of triple is 25%; and probability of homerun is 15%. Those probability values may be recorded in the ROM 22. That is, when determining that the result of the hitting event is hits, the CPU 21 determines a content of the hits with regard to the batting method in the batting event based on the probability values that are recorded in the ROM 22.

The result generator 55 calculates points that a user scores in a single hitting event based on an on-base situation of the runner character(s) RC and a content of the hits. Table information indicating points that are scored based on the content of the hits may be recorded in the ROM 22 for every combination of positions of the runner character(s) RC in the on-base situations. Specifically, referring to the on-base situation of the runner character(s) RC and the content of the hits, the CPU 21 calculates points that are scored. The CPU 21 then adds the points that are scored to the total score. The total score may be recorded in the RAM 23.

The benefit provider 56 includes a function for providing a user with a benefit based on the game result that is generated by the result generator 55. In the present embodiment, the benefit provider 56 provides a user with a benefit, if the total points that the user scores is greater than a given value (10 points for example) before three outs are recorded in the mission processing. It may be configured such that a content of the benefit varies depending on the total points that the user scores before three outs are recorded. For example, the greater the total points that the user gains, the more valuable benefit the user may be provided with. The content of the benefit may be, but not limited to, points usable in the game (a certain amount of the cheering points or the enhancement points, etc.) or a player card that is difficult to obtain in the game (that is, a rare card).

The function of the benefit provider 56 will be realized as described below. The contents of the benefit are recorded in the ROM 22. If a user scores points that is greater than a given value until single mission processing terminates, the CPU 21 refers to the ROM 22 and performs processing for providing the user with a benefit. The processing for providing the user with the benefit may be processing for associating points or items with user ID of the user. In the case in which enhancement points are provided as a benefit to a user for example, the CPU 21 may rewrite enhancement points in user data corresponding to user ID of the user (that is, add the provided enhancement points to one in the user data).

Figure 13A:
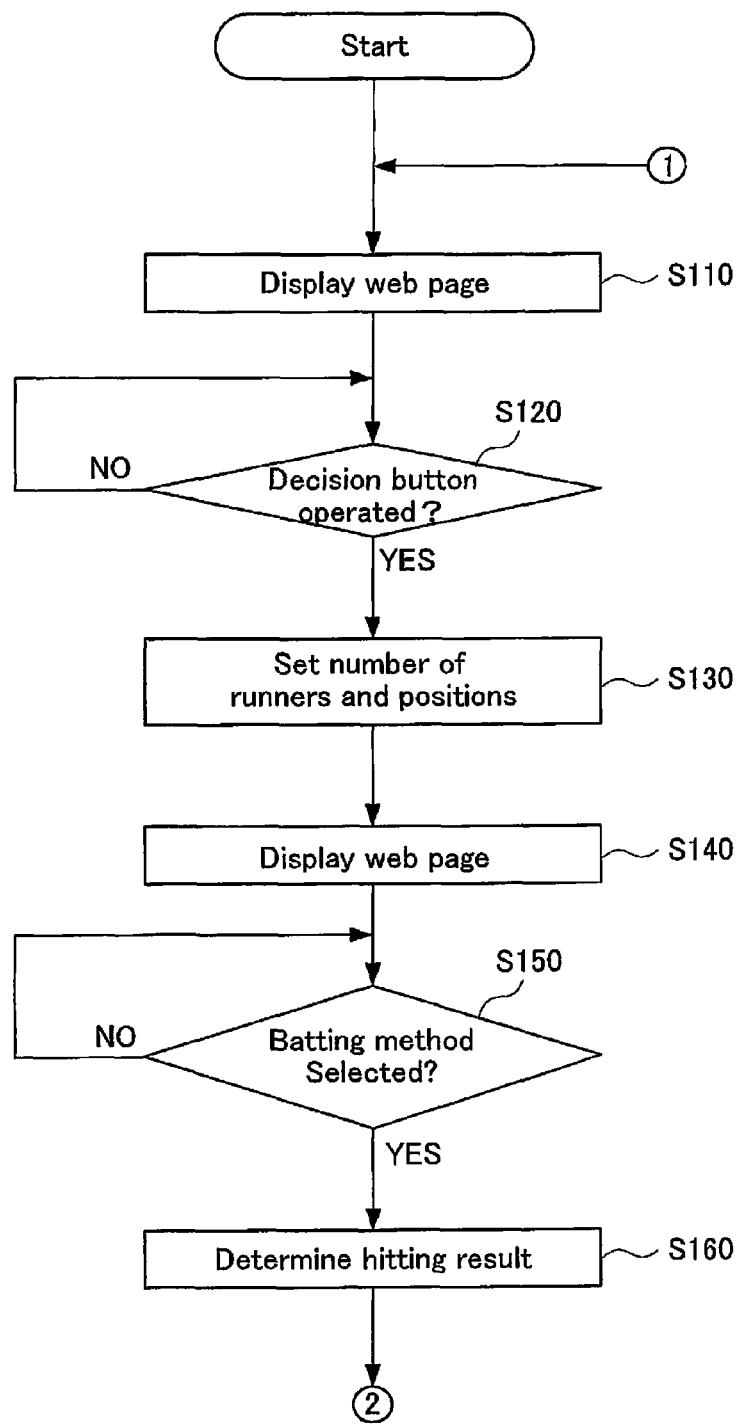
FIG. 13A is an exemplary flowchart for main processing in the game control device according to the first embodiment.
Figure 13B:
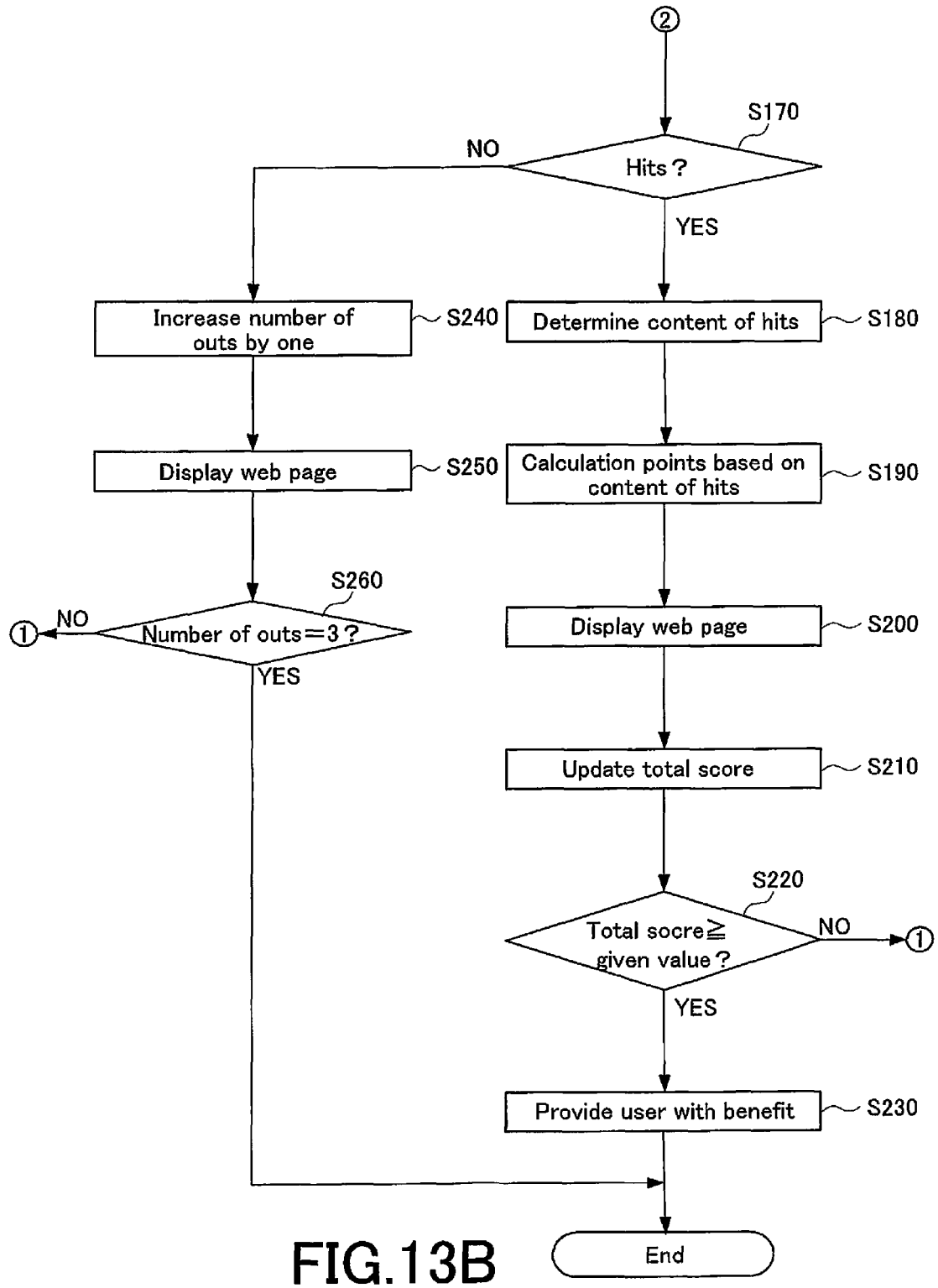
FIG. 13B is an exemplary flowchart for main processing in the game control device according to the first embodiment.

(1-7) Main Processing Flow of the Game Control Device of the Present Embodiment The following is an explanation about an example of a main processing flow performed by the game control device according to the present embodiment with reference to the flowcharts in FIGS. 13A and 13B. The flowcharts in FIGS. 13A and 13B are mainly performed by the setter 53, the event generator 54, the result generator 55, and the benefit provider 56.

After recognizing that the button m6 has been selected in the web page of FIG. 7, the CPU 21 of the game server 20 transmits HTML data to the communication terminal 10. This HTML data is for displaying the web page P1 illustrated in FIG. 8. Resultantly, the web page P1 is displayed on the communication terminal 10 as illustrated in FIG. 8 (Step S110). Then, after recognizing that the button m20 ("decision") has been selected in the web page P1 of FIG. 8 (Step S120: YES), the CPU 21 sets a number of runner(s) (runner character(s) RC) and position(s) of the runner(s) (Step S130). The CPU 21 then transmits HTML data to the communication terminal 10 (Step S140). This HTML data is for displaying the web page P2 illustrated in FIG. 8. At this time, a user can select a batting method according to the user's preference based on the number and the position(s) of the runner character(s) RC.

Next, after recognizing that one of the button m21 ("Hit ball squarely") and the button m22 ("Swing strongly") has been selected (Step S150: YES), the CPU 21 determines a hitting result (hits or outs) based on data for determination illustrated in FIGS. 12A and 12B (Step S160). If the hitting result is hits (Step S170: YES), then the CPU 21 determines a content of the hits (Step S180). Next, the CPU 21 calculates points that are scored based on the content of the hits and the on-base situation of the runner character(s) RC (Step S190). The CPU 21 then transmits HTML data to the communication terminal 10 (Step S200). The transmitted HTML data is for displaying a web page that includes the content of the hits determined at Step S180 and the points calculated at Step S190. The CPU 21 adds the points calculated at Step S190 to the total score to update the same (Step S210). Next, if the total score is equal to or greater than a given value (ten for example) (Step S220: YES), the CPU 21 provides the user with a benefit (Step S230). If the total score is less than the given value, the CPU 21 proceeds to Step S110.

If the hitting result is outs at Step S170, the CPU 21 adds one to the number of outs that is memorized in the RAM 23 (Step S240). Then, the CPU 21 transmits HTML data to the communication terminal 10 (Step S250). The transmitted HTML data is for displaying the web page P4 illustrated in FIG. 8. If the number of outs reaches three (Step S260: YES), the CPU 21 terminates the mission processing. If the number of outs is less than three, the CPU 21 proceeds to Step S110.

As described above, according to the first embodiment, when a hitting event is generated based on information of an operational input under an on-base situation being set, point(s) are scored based on the on-base situation being set and the hitting event. That is, the score is not only determined based solely on the information of the operational input, but is influenced by the on-base situation that is set before the hitting event. This allows the user to keep interest with regard to a process until point(s) are scored. Therefore, monotonous game play that a user pursues a game result only, which is a problem of conventional games, is restrained; thus, game entertainment is enhanced.

In the case of a baseball game as exemplified in the present embodiment, a situation that can be set before a hitting event by a batter can be any one of situations, each of which positions a different number of runners on base(s). In this case, there are more possibilities of scoring or possibilities of increasing the total score as a number of the runners on the base(s) increases. Thus, a user becomes interested in the situation that is set, and therefore keeps interest with regard to a game process until the total score is determined.

(2) Second Embodiment

The second embodiment of the present invention will be described below.

An on-base situation of the runner character(s) RC is randomly set according to the first embodiment. The second embodiment differs from the first embodiment in that the on-base situation of the runner character(s) RC is set for a game-playing user based on a number of users who are associated with the game-playing user.

Configuration that differs from the first embodiment will be described below.

Figure 14:
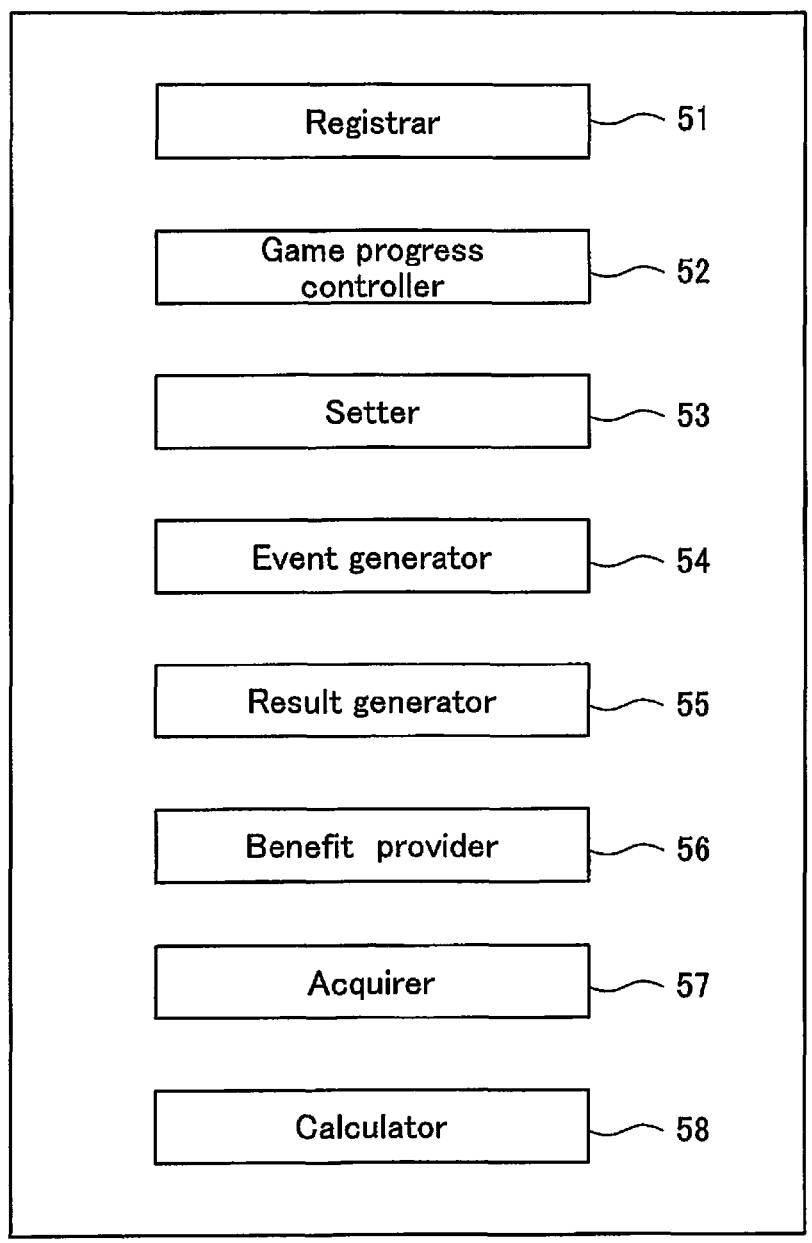
FIG. 14 is a functional block diagram for explaining functions that play main rolls in the game control device according to a second embodiment.

FIG. 14 is a functional block diagram for explaining functions playing main rolls in the game control device according to the second embodiment. The functional block diagram in FIG. 14 differs from one in FIG. 9 in that acquirer 57 and calculator 58 are added.

The acquirer 57 includes a function for acquiring access information from a user. "Access" may be login access by transmitting information required for authentication, such as a password, unique identifier or etc., from the communication terminal 10. "Access" may be access for requesting update of a web page by transmitting information regarding operational inputs in the game after login (transmitting a HTTP request, for example).

The function of the acquirer 57 may be realized as described below. The CPU 21 of the game server 20 records user access information in the database server 32 as log data, every time the CPU 21 recognizes access based on user ID. FIG. 15 illustrates an example of configuration of log data. As illustrated in FIG. 15, the log data indicates user ID and time information of access in order of time when access is recognized.

For example, when receiving a request for transmitting HTML data for displaying the top page illustrated in FIG. 7, the CPU 21 may record user ID and time information of access as the log data. When recognizing a selection operation to the button m6 in the top page of FIG. 7, the CPU 21 may record user ID and time information of access as the log data.

The calculator 58 has a function for calculating a number of users who are friends of a game-playing user (namely, a first user) and performs access during a period of time. Here, two methods may be applied to determine a beginning point of time for the period of time. One of the methods is a method to set a time when a game-playing user logs in as a reference time and to subsequently calculate a number of users accessing to the game during a period of time beginning from the reference time. Another method is a method to set a time when access occurs due to an operational input of the game-playing user as a reference time and to calculate a number of users accessing to the game during a period of time beginning from the reference time. With the latter method, the CPU 21 calculates the number of the users every time access occurs, which results in a certain load. On the other hand, with the latter method, accuracy of the calculated number of the users becomes high. Assuming that a user does not necessarily access immediately after login of the user, accuracy of the calculated number of users with the latter method becomes higher than that with the former method.

The calculator 58 may be realized as described below. The CPU 21 of the game server 20 accesses to the game database server 32 to refer to the log data, and then calculates a number of users who are friends of the game-playing user and performs access during a period of time beginning from a login time of the game-playing user. Alternatively, the CPU 21 accesses to the game database server 32 to refer to the log data every time access occurs from the game-playing user, and then calculates a number of users who are friends of the game-playing user and performs access during a period of time beginning from the access time of the game-playing user. Note that the CPU 21 refers to user data of the game-playing user to specify the friends of the game-playing user.

In the present embodiment, the setter 53 sets the situation such that the game result is advantageous for the game-playing user (namely, a first user) as the number of the users that is calculated by the calculator 58 increases. Here, to "set the situation such that the game result is advantageous . . . " may be to set the situation of bases loaded or to set the situation such that runners are positioned on the second or third base, assuming that "game result" is a score. The setter 53 may set the on-base situation based on situation setting data exemplified in FIG. 16. The situation setting data of FIG. 16, which is memorized in the game database 32, includes a number of friends who login to the game and a number and position(s) of runner(s) (runner character(s) RC). In FIG. 16, the number of runner(s) corresponds to the number of the friends. According to the situation setting data exemplified in FIG. 16, as the number of friends who login to the game increases, the runner character(s) RC are positioned such that the game-playing user can score high easier.

The function of the setter 53 can be realized as described below. The CPU 21 of the game server 20 generates HTML data and transmits the HTML data to the communication terminal 10 through the communication interface unit 25. This HTML data is for displaying the web page P1 illustrated in FIG. 8. When the button m20 is selected on the web page P1 of FIG. 8, the CPU 21 determines a number of runner(s) and base(s) on which the runner(s) are positioned. This determination is based on the situation setting data exemplified in FIG. 16. The CPU 21 may determine the number of runner(s) and the base(s) on which the runner(s) are positioned according to a certain rule. Then, the CPU 21 generates HTML data for displaying the web page P2 of FIG. 8 to the communication terminal 10.

Figure 17:
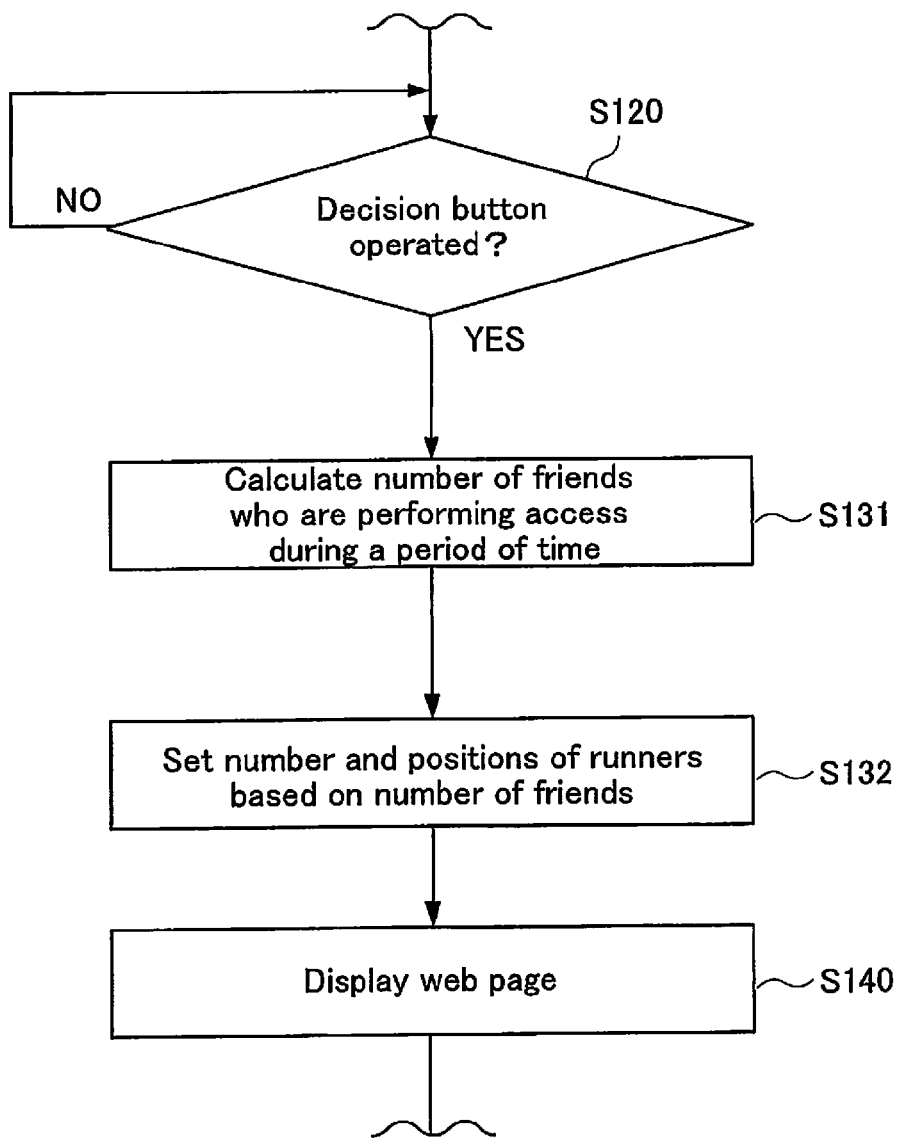
FIG. 17 is a flowchart for explaining a part that differs from the flowcharts illustrated in FIGS. 13A and 13B.

Next, an example of processing flow performed by the game control device according to the present embodiment will be described with reference to the flowcharts in FIG. 17. The flowchart of FIG. 17 is for explaining a part that differs from the flowcharts illustrated in FIGS. 13A and 13B. In FIG. 17, the same signs as FIGS. 13A and 13B are applied for the common part. The flowchart of FIG. 17 is mainly performed by the setter 53 and the calculator 58.

After recognizing that the button m20 ("decision") has been selected in the web page P1 of FIG. 8 (Step S120: YES), the CPU 21 refers to the log data of FIG. 15, and then calculates a number of users who are friends of a game-playing user and performs access during a period of time (Step S131). Next, the CPU 21 refers to the situation setting data of FIG. 16, and then sets a number of runner character (s) RC and position(s) of the runner character (s) (Step S132). The CPU 21 then transmits HTML data to the communication terminal 10 (Step S140). This HTML data is for displaying the web page P2 illustrated in FIG. 8. The subsequent processing are the same as those described in flowchart of FIGS. 13A and 13B.

As described above, there is the following advantageous effect with this game control device according to the second embodiment as well as the advantageous effect based on the game control device according to the first embodiment. That is, as a number of users who are associated with a game-playing user (namely, a first user) and performs access during the period of time increases, the first user can obtain more advantageous game result. Thereby, the first user is motivated to access together with the other users (friends, for example) who are associated with the first user, for the purpose of obtaining more advantageous game result. That is, the friends recognize that they receive more benefits as they access to the game frequently, thereby contributing increase in access numbers of the game as a whole. Resultantly, community in the game is more activated, and a social network in the game is expanded. Moreover, in order for a user to receive the benefit described above, it is assumed that the user asks his or her friend to access to the game by chatting, sending a mail in the game, or the other means for obtaining a benefit described above. Then, game community in the game is even more activated.

(3) Modified Examples (3-1) Modified Example 1

In the second embodiment, when a hitting event is generated more than two times consecutively, the setter 53 may set an on-base situation before each hitting event such that a game result is advantageous for a game-playing user (namely, a first user) as a value increases. Here, the value is initially a number of users calculated by the calculator 58, and the value is decreased by one every time the hitting event is generated.

For example, assuming that an on-base situation is set based on a fixed number of users (number of friends) every time a hitting event is generated, the on-base situation is always set such that a user is able to obtain an advantageous game result if the number of users are large. Thus, a user who has a large number of friends receive considerable benefits, and fairness of users in the game may not be guaranteed. On the other hand, according to the game control device of this modified example, a value which an on-base situation is set based on is decreased every time a hitting event is generated, and an on-base situation is set based on the decreased value; accordingly, a possibility can be reduced that fairness of users is not be guaranteed.

The function of the setter 53 of the present modified example can be realized as described below. The CPU 21 of the game server 20 records a number of friends of a game-playing user as a reference value in the RAM 23. The number of friends are calculated in Step S131 of the flowchart illustrated in FIG. 17. Here, when a hitting event is generated more than two times, the CPU 21 may decrease the reference value in the RAM 23 by one every time the hitting event is generated. For example, if the reference value is five in the first hitting event, runner characters RC are positioned on the first to third bases respectively with reference to the situation setting data illustrated in FIG. 16. Then, the reference value is decreased to four in the second hitting event, and thus runner characters RC are positioned on the second and the third bases. That is, the number of runner characters is decreased by one, and thus a situation in which higher points are scored is less likely to occur in the second hitting event than the first hitting event.

(3-2) Modified Example 2

In the second embodiment, the setter 53 may set the on-base situation based on the access information acquired by the acquirer 54 such that the game result is advantageous for a game-playing user (namely, a first user) as degree of intimacy between the game-playing user and a second user increases. The second user is a user who is associated with the first user and performing access during a period of time. The degree of intimacy indicates a degree of association of the first user and the second user on the game.

Here, a degree of intimacy may be numerical data that indicates a degree of association of users. Such numerical data is determined under a certain rule. FIG. 18 is an example of data of degree of intimacy. In the example of the data of degree of intimacy, data such as: frequency of transmission and reception with regard to cheering messages between users (Cheering frequency), a number of times of transmission and reception with regard to presents such as items usable in the game (Number of times of presents), and the like in association with user ID of friends of respective users. The degree of intimacy is set under a certain rule based on the frequency and the number of times described above. The degree of intimacy is set to be higher value as the cheering frequency or the number of time of presents increases. In the certain rule, weighting may be considered for respective fields ("Cheering frequency" and "Number of times of presents" in FIG. 18 for example) that are basis for setting the degree of intimacy. For example, the degree of intimacy may be set to a high value in the case in which the number of times of presents is large even if the cheering frequency is low. The data of degree of intimacy is recorded in the user database 31 for example.

Consequently, the higher a degree of intimacy between a game-playing user and the user's friend is, the more advantageous game result the game-playing user obtains. In the case of a baseball game for example, a situation that can be set before a hitting event by a batter can be any one of situations, each of which positions runner(s) on different base(s). In this case, as the degree of intimacy increase, a runner may be positioned on a second or a third base rather than a first base. This allows a user to be motivated to access to the game together with friend(s) whose degree of intimacy with the user is high, thereby strengthening association with the friend(s).

The function of the setter 53 will be realized as described below. The CPU 21 of the game server 20 performs processing with regard to user data and data of degree of intimacy for each user ID. The CPU 21 transmits and receives cheering messages or presents between friends through the communication interface unit 25 based on requests from users. Based on the transmission and the reception, the CPU 21 updates the data of degree of intimacy for the friends.

When a user is specified who has a degree of intimacy higher than a given threshold with a game-playing user, the setter 53 may set an on-base situation of bases loaded or set an on-base situation such that runners characters RC are positioned on the second or third base.

(3-3) Modified Example 3

In the second embodiment, the setter 53 may set the on-base situation for a game-playing user (namely, a first user) such that a second user corresponds to the runner character RC based on the access information acquired by the acquirer 57. The second user is a user who is associated with the first user and performing access during a period of time.

The second user (a friend of the first user) is a user who is playing the game at substantially the same time as the first user (game-playing user). Because the hitting event is held such that the friend is used as the running character RC, the game-playing user has a feeling as if he or she was playing a baseball game together with the friend. This allows the game-playing user to be motivated after the hitting event to strengthen a degree of association with the friend.

Figure 19:
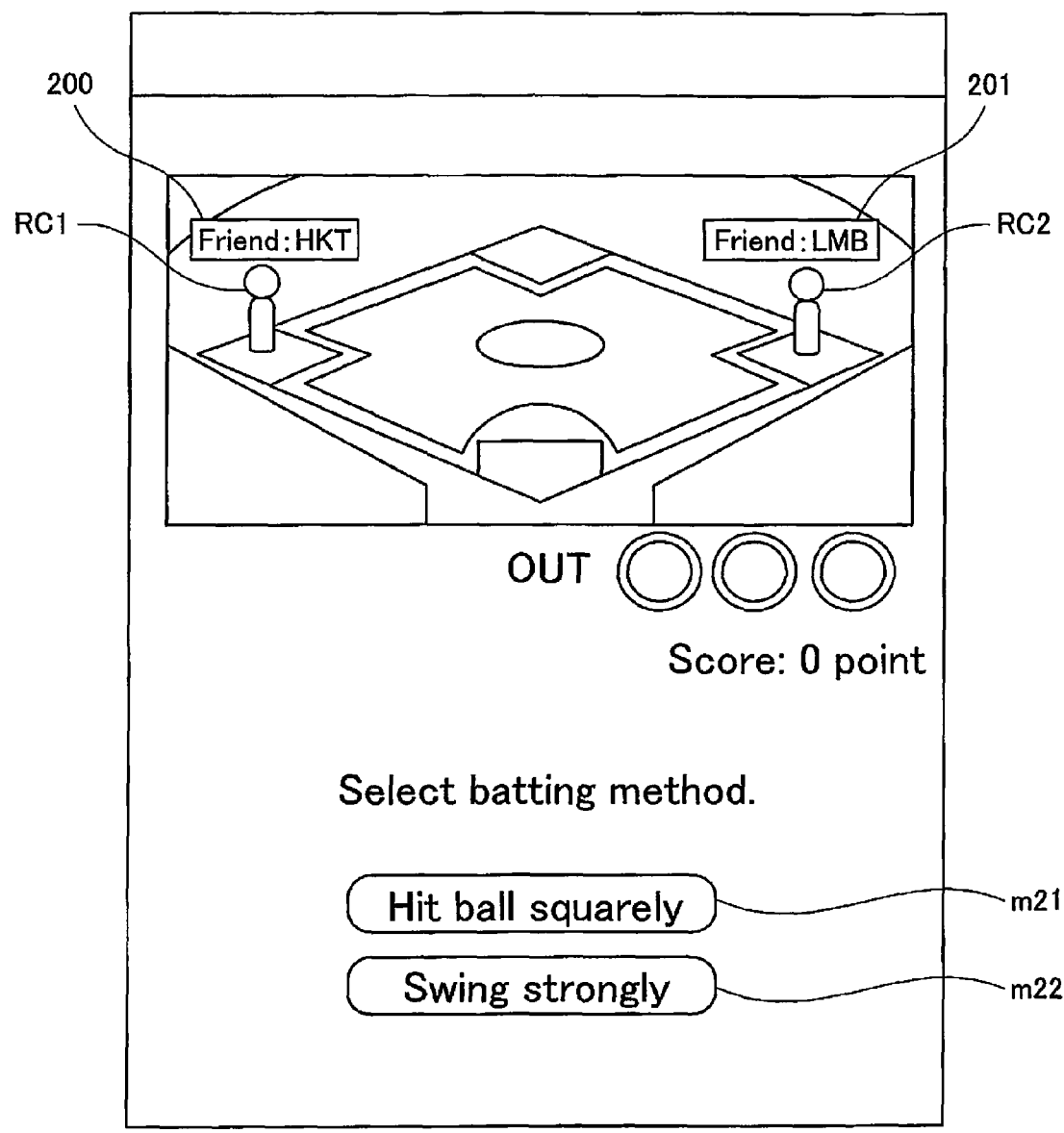
FIG. 19 illustrates an example of a web page according to a modified example.

In the modified example 3, the CPU 21 refers to log data, and extracts friend(s) who perform access during a period of time. Then, the CPU 21 associates user ID(s) of the extracted friend(s) with runner character(s) RC. As illustrated in FIG. 19, the CPU 21 may cause the communication terminal 10 to display a web page that includes areas 200, 201. The areas 200, 201 are for displaying user names of the friends in the vicinity of runner characters RC1, RC2 respectively.

(3-4) Modified Example 4

In the second embodiment, when the running character RC exists on at least one base, the setter 53 may set the on-base situation such that the running character RC corresponding to a second user (a friend of a first user) is positioned on a base closer to the home base as degree of intimacy between a first user (a game-playing user) and the second user increases.

This allows the game-playing user to be motivated to concentrate on playing in the hitting event in order to get the friend to reach the home base.

With the setter 53 in the present modified example, the CPU 21 associates the friend whose degree of intimacy is high with the game-playing user, with a runner character RC that is positioned on a base closer to the home base (that is, in order of the third base, the second base, and the first base).

(3-5) Modified Example 5

In the second embodiment, the setter 53 may set the on-base situation based on the access information acquired by the acquirer 57 such that the game result is advantageous for a first user (game-playing user) as the sum of values increases. Each of the values corresponds to different second users. The second users are associated with the first user and perform access during a period of time. Here, even if only one second user exists, a value corresponding to that second user can be the "sum of the values".

"Value" is for example: a value indicating ability of the respective friends in the game, a progression level, a stage that the respective friends play with in the game, a value indicating ability of a character or an item, etc. or points that the respective friends own in the game.

With this game control device, the second users (friends of the game-playing user) are associated with the game-playing user and perform access during a period of time. Each of the values corresponds to different second users. As the sum of the values increases, the game-playing user can obtain more advantageous game result. Thereby, the game-playing user is motivated to access together with the friends for the purpose of obtaining more advantageous game result. That is, the friends recognize that they receive more benefits as they access to the game frequently, thereby contributing increase in access numbers of the game as a whole. Resultantly, community in the game is more activated, and a social network in the game is expanded. Moreover, in order for a user to receive the benefit described above, it is assumed that the user asks his or her friend to access to the game by chatting, sending a mail in the game, or the other means for obtaining a benefit described above. Then, game community in the game is even more activated.

The function of the setter 53 in the present modified example will be realized as described below. Note that, in the following description, an example of "value" is a skill level that a user ID of a friend is associated with. The value may be any points (action points, operation points, enhancement points, or cheering points) that the user ID of the friend is associated with. The value may be a number of players or an ability value of a player card that the user ID of the friend is associated with.

Referring to the log data, the CPU 21 of the game server 20 specifies a friend who is performing access during a period of time. When a skill level that the specified friend is associated with is equal to or greater than a given threshold, the CPU 21 may position runner characters RC on the first to the third bases. In this way, an on-base situation is set in which there is an opportunity of scoring or a possibility of increasing a score. When a plurality of friends are specified, the CPU 21 may calculate a total of skill levels, each of which the respective specified friends are associated with. Then, if the total of skill levels is equal to or greater than a given threshold, the CPU 21 may position runner characters RC on the first to the third bases.

The exemplary embodiments of the present invention have been explained in detail. However, the present invention is not limited to the aforementioned exemplary embodiments. Further, it is apparent that a variety of changes and modifications can be made for the respective exemplary embodiments without departing from the scope of the present invention.

The case is explained in which an on-base situation is set in the embodiments described above; however, this case is merely an example. A situation in which a ball is heading to a batter may be set. In this case, the setter 53 may set a situation such that a hitting result (game result) differs depending on a color of the ball heading to the batter. For example, if the color of the ball is white, the hitting result may be missing the ball or single. If the color of the ball is red, the hitting result may be single or double. If the color of the ball is yellow, the hitting result may be double or triple. If the color of the ball is gold, the hitting result may be homerun. The CPU 21 may determine the color of the ball randomly or with certain probabilities. The CPU 21 may determine the hitting result (missing the ball, single, double, triple, or homerun) randomly or under a certain rule.

The setter 53 may set a situation in which a user plays a penalty shootout of a soccer game to prevent a ball from entering a net in. In this case, it may be configured such that gained points (game result) vary depending on a color of the ball that the user has prevented from entering a net.

In the embodiments described above, the case is explained in which hitting events are repeatedly generated; however, a single hitting even may be generated.

While an example has been described in which a social network game is realized, the game for which the present invention may be applied is not limited to the social network game. For example, an online game system may be applied in which a server device on a network and a home online game machine are connected. With such online game system, progress of the game can be controlled in the same way as the embodiments described above.

In the embodiments described above, respective functions of the setter 53, the event generator 54, the result generator 55, the acquirer 57, and the calculator 58 are configured to be realized by the game server 20 and the database server 30 on a network; however, the present invention is not limited to such configuration. All of the components may be configured to be realized by the communication terminal 10, or a portion of the components may be configured to be realized by the communication terminal 10. Because the communication terminal 10 and the game server 20 may involve the substantially same hardware configuration, the functions can be also realized by the communication terminal 10 as described in the above embodiments. When the game is ended, the communication terminal 10 transmits data of a game result to the game server 20. Then, the game server 20 receives the data of the game result, and records the data in the game database 32 in association with the user.

<Appendix>

Aspects of the present invention are disclosed hereinafter.

A first aspect of the present invention is a game control device executing a game that simulates a sport or an amusement in the real world, the device including:

a setter configured to set a situation in a sport or an amusement before an event on the game;

an event generator configured to generate the event based on information of an operational input under the situation set by the setter; and a result generator configured to generate a game result based on the situation set by the setter and the event generated by the event generator.

"Event" is an event that is simulated in a game. "Event" may be arbitrarily defined so long as it could happen in a sport or an amusement in the real world. In the case of a baseball game, "event" may be a hitting event, a pitching event, a running event, or the like. In the case of a soccer game, "event" may be a penalty kick event, a corner kick event, or the like. "Situation in sports or amusements" may be, in the case of a baseball game for example, a situation in which a runner is positioned on a base, or a situation in which a ball is thrown to a batter. "Information of an operational input" may be information indicating that an operational input is performed with regard to an external device that is accessible to a game control device, for example. "Game result" may be not limited to an overall result for a game, but may be a result for a phase or a part of the game. For example, in the case of a baseball game, "game result" may be a hitting result (hits or outs). "Game result" may be points that are gotten with one time hitting.

In this game control device, when an event is generated based on the information of the operational input under the situation being set, the game result is obtained based on the situation being set and the event. Then, the game result is not only be determined based solely on the information of the operational input, but is influenced by the situation that is set before the event. This allows the user to keep interest with regard to a game process until the game result is obtained. Therefore, monotonous game play that a user pursues a game result only is restrained, and game entertainment is enhanced.

In the case of a baseball game for example, a situation that can be set before a hitting event by a batter can be any one of situations, each of which positions a different number of runners on base(s). In this case, there are more possibilities of scoring or possibilities of increasing the total score as a number of the runners on the base(s) increases. Thus, a user becomes interested in the situation that is set, and therefore keeps interest with regard to a game process.

This game control device may further include:

an associator configured to associate users;

an acquirer configured to acquire access information from a user; and a calculator configured to calculate a number of the users who are associated with a first user, the users performing access during a period of time based on the access information acquired by the acquirer, the first user playing the game, wherein the setter sets the situation such that the game result is advantageous for the first user as the number of the users increases.

"Access" in this game control device may be login access by transmitting information from the communication terminal that is required for authentication. "Access" may be also access by transmitting information regarding operational inputs in the game after login. "Accessing during a period of time" means that, for example, access occurs from a communication terminal at least once during a past period of time on a basis of the present time, etc. and does not necessarily mean that continuous access or consecutive accesses should occur during the past period of time.

With this game control device, the first user is a user who is playing the game. As a number of users who are associated with the first user and performs access during the period of time increases, the first user can obtain more advantageous game result. Thereby, the first user is motivated to access together with the other users (friends, for example) who are associated with the first user, for the purpose of obtaining more advantageous game result. That is, the friends recognize that they receive more benefits as they access to the game frequently, thereby contributing increase in access numbers of the game as a whole. Resultantly, community in the game is more activated, and a social network in the game is expanded. Moreover, in order for a user to receive the benefit described above, it is assumed that the user asks his or her friend to access to the game by chatting, sending a mail in the game, or the other means for obtaining a benefit described above. Then, game community in the game is even more activated.

This game control device may further include:

an associator configured to associate users;

an acquirer configured to acquire access information from a user; and a calculator configured to calculate a number of the users associated with a first user, the users performing access during a period of time based on the access information acquired by the acquirer, the first user playing the game, wherein the event is generated more than two times consecutively, the setter sets the situation before the event on the game such that the game result is advantageous for the first user as a value increases, the value being initially the number of the users calculated by the calculator, the value being decreased by one every time the event is generated.

For example, assuming that a situation is set based on a fixed number of users (a number of friends of a first user, namely a game-playing user) every time an event is generated, a situation is always set such that the game-playing user is able to obtain an advantageous game result if the number of the users are large. Thus, a user who has a large number of friends receive considerable benefits, and fairness of users in the game may not be guaranteed. On the other hand, according to this game control device, a value corresponding to the number of the users (the number of the friends) which a situation is set based on is decreased every time an event is generated, and a situation is set based on the decreased value; accordingly, a possibility can be reduced that fairness of users is not be guaranteed.

The game control device may further include:

an associator configured to associate users; and an acquirer configured to acquire access information from a user, wherein the setter sets the situation based on the access information acquired by the acquirer such that the game result is advantageous for a first user as degree of intimacy between the first user and a second user increases, the first user playing the game, the second user being associated with the first user, the second user performing access during a period of time, the degree of intimacy indicating a degree of association of the first user and the second user on the game.

Here, the degree of intimacy may be numerical data that indicates the degree of association of the first user and the second user. Such numerical data is determined under a certain rule.

In this game control device, the first user is a user who is playing the game, while the second user is a user who is associated with the first user and performing access during the period of time. Then, the first user can obtain more advantageous game result, as the degree of intimacy between the first user and a second user increases. In the case of a baseball game for example, a situation that can be set before a hitting event by a batter can be any one of situations, each of which positions runner(s) on different base(s). In this case, as the degree of intimacy increase, a runner may be positioned on a second or a third base rather than a first base. This allows the first user to be motivated to access to the game together with friend(s) whose degree of intimacy with the first user is high, thereby strengthening association with the friend (s).

The game control device may further include:

an associator configured to associate users; and an acquirer configured to acquire access information from a user, wherein the setter sets the situation based on the access information acquired by the acquirer such that the game result is advantageous for a first user as the sum of values increases, the first user playing the game, the values each corresponding to different second users, the second users being associated with the first user, the second users performing access during a period of time.

Here, even if only one second user exists, a value corresponding to that second user can be the "sum of values."

"Value" is for example: a value indicating ability of the respective second users in the game, a progression level, a stage that the respective second users play with in the game, a value indicating ability of a character or an item, etc. or points that the respective second users own in the game.

With this game control device, the first user is a user who is playing the game, while the second users is associated with the first user and performing access during a period of time. Each of the values corresponds to each of the second users (friends of the first user, for example). As the sum of the values increases, the first user can obtain more advantageous game result. Thereby, the first user is motivated to access together with the other users (friends, for example) who are associated with the first user, for the purpose of obtaining more advantageous game result. That is, the friends recognize that they receive more benefits as they access to the game frequently, thereby contributing increase in access numbers of the game as a whole. Resultantly, community in the game is more activated, and a social network in the game is expanded. Moreover, in order for a user to receive the benefit described above, it is assumed that the user asks his or her friend to access to the game by chatting, sending a mail in the game, or the other means for obtaining a benefit described above. Then, game community in the game is even more activated.

A second aspect of the present invention is a game control device executing a game that simulates a baseball, the device includes:

a setter configured to set an on-base situation of a runner character before a hitting event on the game;

an event generator configured to generate the hitting event based on information of an operational input under the on-base situation set by the setter; and a result generator configured to generate a game result based on the on-base situation set by the setter and the hitting event generated by the event generator.

With this game control device, if a hitting event is generated based on information of an operational input under the on-base situation that is being set, then a game result is obtained based on the set on-base situation and the hitting event. Thus, because complicated operational inputs are not required to obtain the game result, a user can play the game with easy operation. Moreover, this game control device makes the user think about which hitting event should be generated based on the information of the operational input in order to obtain a good game result under the on-base situation that is being set. This allows the user to keep interest with regard to a game process until the game result is obtained, thereby enhancing game entertainment.

The game control device may further include:
an associator configured to associate users; and
an acquirer configured to acquire access information from a user,
wherein the setter sets the on-base situation for a first user such that a second user corresponds to the runner character based on the access information acquired by the acquirer, the first user playing the game, the second user being associated with the first user and performing access during a period of time.

With this
game control device, the second user is a user who is playing the game at substantially the same time as the first user. Because the hitting event is generated such that the second user is used as the running character, the first user has a feeling as if he or she was playing a baseball game together with the second user. This allows the first user to be motivated after the hitting event to strengthen a degree of association with the second user.

In the game control device, when the running character exists on at least one base, the setter sets the on-base situation such that the running character corresponding to the second user is positioned on a base that is close to the home base as degree of intimacy between the first user and the second user increases, the degree of intimacy indicating a degree of association of the first user and the second user on the game.

This allows the first user to be motivated to concentrate on playing in the hitting event in order to get his or her friend to reach the home base.

A third aspect of the present invention is a game control method for a game that simulates a sport or an amusement in the real world includes:

setting a situation in a sport or an amusement before an event on the game;

generating the event based on information of an operational input under the situation set by the setting; and generating a game result based on the situation set by the setting and the event generated by the generating the event.

A fourth aspect of the present invention is a non-transitory computer-readable recording medium containing a program for enabling a computer to perform a method, the method includes:

setting a situation in a sport or an amusement before an event on the game;

generating the event based on information of an operational input under the situation set by the setting; and generating a game result based on the situation set by the setting and the event generated by the generating the event.

The computer may be, for example, a network server, or a large computer, etc. The program may be stored in a computer-readable information storage medium, such as DVD-ROM, CD-ROM, etc.

A fifth aspect of the present invention is a game system that includes a communication terminal and a server controlling execution of a game that simulates a sport or an amusement in the real world with the communication terminal, the game system includes:

a setter configured to set a situation in a sport or an amusement before an event on the game;

an event generator configured to generate the event based on information of an operational input under the situation set by the setter; and a result generator configured to generate a game result based on the situation set by the setter and the event generated by the event generator.

What is claimed is:

1. A game control device executing a game that simulates a sport or an amusement in the real world, the device comprising:
　　a setter configured to set a situation in a sport or an amusement before an event on the game;
　　an event generator configured to generate the event based on information of an operational input under the situation set by the setter;
　　a result generator configured to generate a game result based on the situation set by the setter and the event generated by the event generator;
　　an associator configured to associate users;
　　an acquirer configured to acquire access information from a user; and
　　a calculator configured to calculate a number of the users associated with a first user, the users performing access during a period of time based on the access information acquired by the acquirer, the first user playing the game,
　　such that the event is generated more than two times consecutively, the setter sets the situation before the event on the game such that the game result is advantageous for the first user as a value increases, the value being initially the number of the users calculated by the calculator, and the value being decreased by one every time the event is generated.

2. A game control device executing a game that simulates a baseball game, the device comprising:
　　a setter configured to set an on-base situation of a runner character before a hitting event on the game;
　　an event generator configured to generate the hitting event based on information of an operational input under the on-base situation set by the setter;
　　a result generator configured to generate a game result based on the on-base situation set by the setter and the hitting event generated by the event generator;
　　an associator configured to associate users; and an acquirer configured to acquire access information from a user, such that the setter sets the on-base situation for a first user such that a second user corresponds to the runner character based on the access information acquired by the acquirer, the first user playing the game, the second user being associated with the first user and performing access during a period of time.

3. The game control device according to claim 2, wherein when the running character exists on at least one base, the setter sets the on-base situation such that the running character corresponding to the second user is positioned on a base that is close to the home base as degree of intimacy between the first user and the second user increases, the degree of intimacy indicating a degree of association of the first user and the second user on the game.

4. A game control method for a game that simulates a sport or an amusement in the real world, the method comprising:

setting, by a processor, a situation in a sport or an amusement before an event on the game;

generating, by the processor, the event based on information of an operational input under the situation set by the setting;

generating, by the processor, a game result based on the situation set by the setting and the event generated by the generating the event;

associating users by the processor;

acquiring, by the processor, access information from a user; and calculating, by the processor, a number of the users associated with a first user, the users performing access during a period of time based on the access information acquired by the acquiring, the first user playing the game, such that the event is generated more than two times consecutively, the setting sets the situation before the event on the game such that the game result is advantageous for the first user as a value increases, the value being initially the number of the users calculated by the calculating, and the value being decreased by one every time the event is generated.

5. A game control method for a game that simulates a baseball game, the method comprising:

setting, by a processor, an on-base situation of a runner character before a hitting event on the game;

generating, by the processor, the hitting event based on information of an operational input under the on-base situation set by the setting;

generating, by the processor, a game result based on the on-base situation set by the setting and the hitting event generated by the generating the event;

associating users by the processor; and acquiring, by the processor, access information from a user, such that the setting sets the on-base situation for a first user such that a second user corresponds to the runner character based on the access information acquired by the acquiring, the first user playing the game, the second user being associated with the first user and performing access during a period of time.

6. The game control method according to claim 5, wherein when the running character exists on at least one base, the setting sets the on-base situation such that the running character corresponding to the second user is positioned on a base that is close to the home base as degree of intimacy between the first user and the second user increases, the degree of intimacy indicating a degree of association of the first user and the second user on the game.

7. A non-transitory computer-readable recording medium containing a program for enabling a computer to perform a method for a game that simulates a sport or an amusement in the real world, the method comprising:

setting a situation in a sport or an amusement before an event on the game;

generating the event based on information of an operational input under the situation set by the setting;

generating a game result based on the situation set by the setting and the event generated by the generating the event;

associating users;

acquiring access information from a user; and calculating a number of the users associated with a first user, the users performing access during a period of time based on the access information acquired by the acquiring, the first user playing the game, such that the event is generated more than two times consecutively, the setting sets the situation before the event on the game such that the game result is advantageous for the first user as a value increases, the value being initially the number of the users calculated by the calculating, and the value being decreased by one every time the event is generated.

8. A non-transitory computer-readable recording medium containing a program for enabling a computer to perform a method for a game that simulates a baseball game, the method comprising:

setting an on-base situation of a runner character before a hitting event on the game;

generating the hitting event based on information of an operational input under the on-base situation set by the setting;

generating a game result based on the on-base situation set by the setting and the hitting event generated by the generating the event;

associating users; and acquiring access information from a user, such that the setting sets the on-base situation for a first user such that a second user corresponds to the runner character based on the access information acquired by the acquiring, the first user playing the game, the second user being associated with the first user and performing access during a period of time.

9. The non-transitory computer-readable recording medium according to claim 8, wherein when the running character exists on at least one base, the setting sets the on-base situation such that the running character corresponding to the second user is positioned on a base that is close to the home base as degree of intimacy between the first user and the second user increases, the degree of intimacy indicating a degree of association of the first user and the second user on the game.

10. A game system that includes a communication terminal and a server controlling execution of a game that simulates a sport or an amusement in the real world with the communication terminal, the game system comprising:

a setter configured to set a situation in a sport or an amusement before an event on the game;

an event generator configured to generate the event based on information of an operational input under the situation set by the setter;

a result generator configured to generate a game result based on the situation set by the setter and the event generated by the event generator;

an associator configured to associate users;

an acquirer configured to acquire access information from a user; and a calculator configured to calculate a number of the users associated with a first user, the users performing access during a period of time based on the access information acquired by the acquirer, the first user playing the game, such that the event is generated more than two times consecutively, the setter sets the situation before the event on the game such that the game result is advantageous for the first user as a value increases, the value being initially the number of the users calculated by the calculator, and the value being decreased by one every time the event is generated.

11. A game system that includes a communication terminal and a server controlling execution of a game that simulates a baseball game with the communication terminal, the game system comprising:

a setter configured to set an on-base situation of a runner character before a hitting event on the game;

an event generator configured to generate the hitting event based on information of an operational input under the on-base situation set by the setter;

a result generator configured to generate a game result based on the on-base situation set by the setter and the hitting event generated by the event generator;

an associator configured to associate users; and an acquirer configured to acquire access information from a user, such that the setter sets the on-base situation for a first user such that a second user corresponds to the runner character based on the access information acquired by the acquirer, the first user playing the game, the second user being associated with the first user and performing access during a period of time.

12. The game system according to claim 11, wherein when the running character exists on at least one base, the setter sets the on-base situation such that the running character corresponding to the second user is positioned on a base that is close to the home base as degree of intimacy between the first user and the second user increases, the degree of intimacy indicating a degree of association of the first user and the second user on the game.

\* \* \* \* \*